(12) United States Patent
Goswami

(10) Patent No.: US 9,361,630 B1
(45) Date of Patent: Jun. 7, 2016

(54) PROVISION OF LOCATION BASED SERVICES

(76) Inventor: Subrata Goswami, Milpitas, CA (US)

(*) Notice: Subject to any disclaimer, the term of this patent is extended or adjusted under 35 U.S.C. 154(b) by 750 days.

(21) Appl. No.: 12/752,158

(22) Filed: Apr. 1, 2010

(51) Int. Cl.
| | | |
|---|---|---|
| *H04W 24/00* | (2009.01) | |
| *G06Q 30/02* | (2012.01) | |
| *H04L 12/58* | (2006.01) | |
| *H04W 4/18* | (2009.01) | |

(52) U.S. Cl.
CPC ........ *G06Q 30/0252* (2013.01); *G06Q 30/0267* (2013.01); *H04L 12/5855* (2013.01); *H04W 4/18* (2013.01)

(58) Field of Classification Search
CPC ........ H04W 4/02; H04W 4/04; H04W 48/14; H04W 64/00; H04W 64/003; G01S 1/68; G01S 1/024; G01S 1/0242; G01S 1/02; G01S 5/0027; G01S 5/0231; G01S 11/06; G01S 11/02; G01S 19/17; G01S 19/42; G01C 15/04; G01C 21/206; G06Q 30/02; G06Q 30/0252; G06Q 30/0254; G06Q 30/0267; H04L 12/5855; H04L 51/14; H04L 67/12; H04L 67/18
USPC ............. 455/456.1, 456.3, 456.5, 456.6, 457, 455/41.2; 342/385
See application file for complete search history.

(56) References Cited

U.S. PATENT DOCUMENTS

| | | | |
|---|---|---|---|
| 4,045,767 A | 8/1977 | Nishihara et al. | |
| 5,539,705 A | 7/1996 | Akerman et al. | |
| 5,781,195 A * | 7/1998 | Marvin | 345/428 |
| 5,982,297 A | 11/1999 | Welle | |
| 6,040,801 A * | 3/2000 | Dawirs | 342/457 |
| 6,343,049 B1 | 1/2002 | Toda | |
| 6,363,139 B1 | 3/2002 | Zurek et al. | |
| 6,717,983 B1 | 4/2004 | Toda | |
| 7,146,178 B2 | 12/2006 | Lehikoinen et al. | |
| 7,218,941 B1 * | 5/2007 | Kubo et al. | 455/456.6 |
| 7,333,676 B2 | 2/2008 | Myers et al. | |
| 7,430,181 B1 * | 9/2008 | Hong | 370/254 |
| 7,441,032 B2 | 10/2008 | Costa Requena | |
| 2002/0039905 A1* | 4/2002 | Remy | 455/456 |
| 2002/0155844 A1* | 10/2002 | Rankin et al. | 455/456 |
| 2004/0152420 A1* | 8/2004 | Redi et al. | 455/67.11 |
| 2004/0152471 A1* | 8/2004 | MacDonald et al. | 455/456.1 |
| 2005/0064877 A1* | 3/2005 | Gum et al. | 455/456.1 |
| 2005/0136845 A1* | 6/2005 | Masuoka et al. | 455/67.14 |
| 2006/0094449 A1* | 5/2006 | Goldberg | 455/456.6 |

(Continued)

*Primary Examiner* — Olumide T Ajibade Akonai
(74) *Attorney, Agent, or Firm* — Ash Tankha; Lipton, Weinberger & Husick

(57) ABSTRACT

A method and system for providing location based services to a user are provided. Multiple beacons are strategically positioned in predetermined locations in an environment. The beacons encode and project beacon related information. A client application is provided on the user's communication device. The client application captures the beacon related information in one or more communication modes, extracts the captured beacon related information, and sends a request to a service management server for area information and contextual information based on the extracted beacon related information via a communication network. The service management server assembles and transmits area information and contextual information to the communication device based on the sent request from the client application via the communication network. The client application identifies its location and acquires location based services on the user's communication device based on the identified location and the transmitted area information and contextual information.

19 Claims, 14 Drawing Sheets

(56) References Cited

U.S. PATENT DOCUMENTS

| | | |
|---|---|---|
| 2008/0045236 A1* | 2/2008 | Nahon et al. ............ 455/456.1 |
| 2008/0280624 A1* | 11/2008 | Wrappe .................... 455/456.1 |
| 2009/0191899 A1 | 7/2009 | Wilson et al. |
| 2009/0224909 A1* | 9/2009 | Derrick et al. ........... 340/539.13 |
| 2009/0233623 A1 | 9/2009 | Johnson |
| 2009/0275348 A1 | 11/2009 | Weinreich et al. |
| 2009/0315995 A1* | 12/2009 | Khosravy et al. ............ 348/158 |
| 2011/0177828 A1* | 7/2011 | Bocquet et al. ............ 455/456.1 |

* cited by examiner

PROVISION OF LOCATION BASED SERVICES

BACKGROUND

Under typical indoor conditions, existing methods for location determination, such as direct reception of global positioning system signals by a mobile station or triangulation using signals from multiple base stations, are not sufficient to deduce accurate location of the communication device. Also, since global positioning systems have minimal coverage inside big buildings, if any coverage at all, the position of a user cannot be accurately determined.

In existing location based service methods, a server processes all the services and information centrally, and therefore the network connection between the user's communication device and the server has to be active for continual usage and information retrieval. Moreover, the user has to manually synchronize the communication device to acquire area based information and contextual information.

In existing location based service methods, a standard set of queries relevant to the user's interests and information requirements is not addressed and hence the user has to repeatedly contact a reactive system wherein the user has to specify the most obvious of queries to acquire relevant information.

Hence, there is a long felt but unresolved need for a method and system that accurately determines the location of a user and provides the required location based services based on the determined location and context to the user with minimal user intervention.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for accurately determining location of a user and providing location based services to the user. By strategically positioning beacons in selected locations, the communication device of the user quickly and reliably receives fixed location references that allow accurate and specific location determination of the user's communication device. The method and system disclosed herein enables users to have an interactive experience within and outside a networked environment. The method and system disclosed herein establishes contact between the communication device and the beacons automatically, without the user having to intervene. Furthermore, a constantly active network connection is not required since a client application on the communication device processes the queried services.

In the method and system disclosed herein, multiple beacons are strategically positioned in predetermined locations in an environment. The beacons encode and project beacon related information. The beacon related information comprises, for example, location identification information of the beacons, positional coordinates of the beacons within the predetermined locations, signal characteristics of the beacons, antenna type of the beacons, shape of a radiated beam, aperture, transmit power of the beacons, angular orientation of an antenna of each of the beacons with respect to geographic north and a ground plane, etc. A client application is provided on a communication device of a user. The communication device is capable of receiving the beacon related information from the beacons in one or more communication modes. For example, the communication device is capable of receiving the beacon related information from the beacons in the form of wireless frames, ultrasonic frames, infrared frames, etc. The client application captures the beacon related information in one or more of the communication modes. The communication modes comprise, for example, one or more of a radio frequency mode, a sonic frequency mode, an ultrasonic frequency mode, an infrared signaling mode, and an optical signaling mode. The client application extracts the captured beacon related information.

The client application sends a request to the service management server for area information and contextual information based on the extracted beacon related information via a communication network. The area information is, for example, a map expressed in a portable network graphics (PNG) format, an indoor layout expressed in an extensible markup language (XML) format, a drawing exchange format (DXF), etc., location of beacons in a rectangular coordinate system, etc. The contextual information is, for example, advertisements, promotions, events, current occupants of a room, meeting/conference in progress in an auditorium, etc. The service management server assembles and transmits the area information and the contextual information to the communication device based on the sent request from the client application via the communication network.

The client application identifies location of the communication device in the environment by determining characteristics of the communication device and utilizing, for example, the extracted beacon related information, determined characteristics of the communication device, and the assembled and transmitted area information acquired from the service management server. The characteristics of the communication device comprise, for example, angular orientation of the communication device, type of antenna of the communication device, shape of a radiated beam, and aperture. The extracted beacon related information comprises, for example, angular orientation of the beacon antenna, radiated beam shape, transmit power, etc. The client application acquires the location based services based on the identified location, the transmitted area information, and the contextual information. In an embodiment, the client application on the communication device and/or the service management server render the location based services to the user. The client application collects usage statistics on the communication device and periodically transmits the usage statistics to the service management server. In an embodiment, the beacons collect usage statistics of the communication device and periodically transmit the usage statistics to the service management server.

In an embodiment, the beacons periodically transmit the beacon related information as one or more beacon frames to delineate multiple zones. The beacons comprise, for example, one of a radio frequency component, a sonic transducer, an ultrasonic transducer, one or more infrared components, etc. for transmitting the beacon related information as one or more beacon frames in one of the communication modes receivable by the communication device. In an embodiment, the client application detects one or more of the beacons in the proximity of the communication device when the communication device enters one or more of the zones delineated by the detected beacons. The client application captures the beacon related information from the detected beacons. In another embodiment, one or more of the beacons detect the presence of the communication device when the communication device enters one or more zones delineated by the beacons.

The beacons transmit the beacon related information to the detected communication device.

The client application captures and extracts the beacon related information encoded in the beacon frames when the communication device enters one or more of the delineated zones. The beacon frames captured by the client application on the communication device carry the beacon related information that specifies or translates to local coordinates or global coordinates. The client application deduces ground position of the communication device based on the beacon related information captured from the beacons, the characteristics of the communication device, and the area information and the contextual information acquired from the service management server. The ground position is utilized for acquiring the location based services on the communication device.

In an embodiment, the beacons comprise directional antennas configured to generate direct line of sight paths that produce confined volumes of space for transmitting the beacon related information as one or more beacon frames within the zones delineated by the beacons. Each of the beacons employs minimal receiving functionality required for conformance to collision avoidance. In an embodiment, the beacons are standalone beacons, for example, location beacons, that transmit a predefined set of location identification information, area information, and contextual information to the communication device via a first communication link. The location identification information identifies the location of the communication device. The communication device communicates with the service management server via second communication links for accessing detailed area information and contextual information. In another embodiment, the beacons are interactive beacons that link the communication device to the service management server for transmitting the area information and the contextual information to the communication device. In another embodiment, the communication device remotely accesses the service management server for acquiring the area information, the contextual information, and the location based services.

In another embodiment, the communication device captures a graphical representation of the beacon related information projected by the beacons. The graphical representation comprises, for example, an outer section comprising a pattern of elementary shapes and an inner section comprising one or more lines of characters. The client application extracts the beacon related information from the captured graphical representation by optically scanning the graphical representation.

The service management server and the communication device operate in a mutually agreed upon format for exchanging the area information and the contextual information. The area information and the contextual information are acquired from, for example, a map, a spatial database, pictures, etc. The area information and the contextual information are assembled and processed in the service management server and acquired by the communication device. The information acquired by the communication device is, for example, a subset of the information contained in the service management server, in and around the location of the communication device. In an embodiment, the client application renders the acquired area information and contextual information on, for example, the display unit of the communication device. In another embodiment, the client application processes the acquired area information and contextual information and displays the processed information on the communication device.

BRIEF DESCRIPTION OF THE DRAWINGS

The foregoing summary as well as the following detailed description of the invention is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
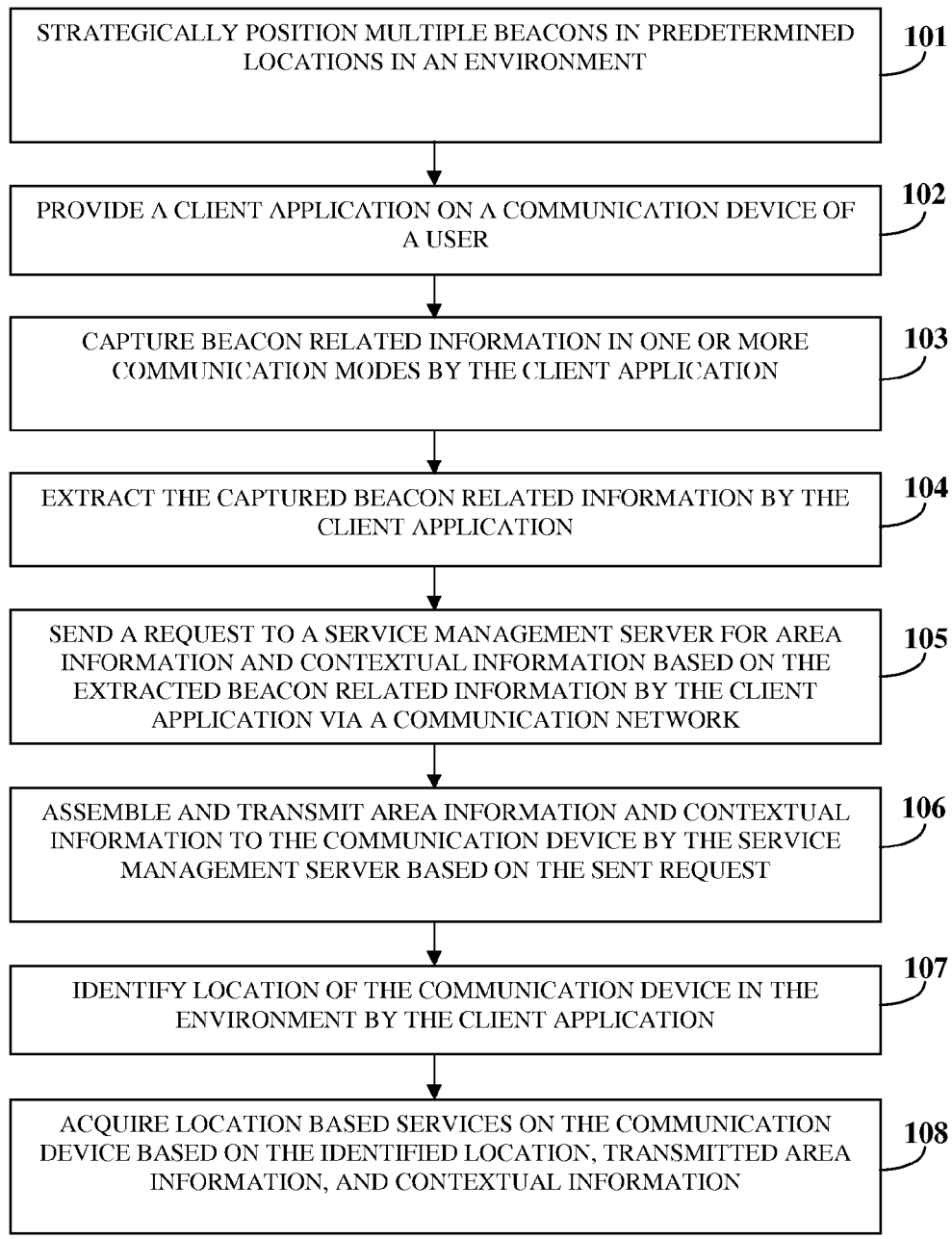
FIG. 1 illustrates a method of providing location based services to a user.

FIG. 1 illustrates a method of providing location based services to a user. As used herein, the term "location based services" refers, for example, to providing in-building or campus navigation information, rendering location based advertisements and other contextual information, etc. Multiple beacons are strategically positioned 101 in predetermined locations in an environment. As used herein, the term "predetermined locations" refers to, for example, indoor locations, outdoor locations, locations within a networked environment, locations in a room environment, and a combination thereof. Also, as used herein, the term "beacons" refers to network infrastructure equipment that encodes and projects beacon related information. The beacon related information comprises, for example, location identification information of the beacons within the environment and predetermined locations, positional coordinates of the beacons within the predetermined locations, signal characteristics of the beacons, antenna types of the beacons, shape of a radiated beam, aperture, transmit power of the beacons, orientation of the beacons, angular orientation of an antenna of each of the beacons with respect to a geographic north and a ground plane, local coordinates, global coordinates, etc.

A client application is provided 102 on the communication device, for example, a mobile phone, of the user. The communication device is capable of receiving the beacon related information from the beacons in one or more communication modes. The communication modes comprise, for example, one or more of a radio frequency mode, a sonic frequency mode, an ultrasonic frequency mode, an infrared signaling mode, an optical signaling mode, etc. The client application captures 103 the beacon related information in one or more of the communication modes. The client application processes and extracts 104 the beacon related information and other relevant encoded information, for example, beacon identifiers, type of the beacons, etc.

The client application sends a request 105 to a service management server for area information and contextual information based on the extracted beacon related information via a communication network. The area information is, for example, an indoor map expressed in a portable network graphics (PNG) formatted image file with identified map elements in terms of pixels in the image file, an indoor layout expressed in an extensible markup language (XML) format, a drawing exchange format (DXF), location of the beacons in a rectangular coordinate system, etc. The contextual information is, for example, advertisements, commercials, current occupants of a room, meeting/conference in progress in an auditorium, an office number, cafeteria menu, etc. The service management server assembles and transmits 106 the area information and the contextual information to the communication device based on the sent request from the client application via the communication network.

The client application identifies 107 location of the communication device in the environment based on one or more of the extracted beacon related information, characteristics of the communication device, and the assembled and transmitted area information. The client application determines the characteristics of the communication device and utilizes, for example, the extracted beacon related information, determined characteristics of the communication device, and the information acquired from the service management server to identify the location of the communication device. The characteristics of the communication device comprise, for example, angular orientation of the communication device, type of antenna of the communication device, shape of a radiated beam, aperture, etc. For example, when the communication device enters a building and detects a beacon, the client application on the communication device determines the exact building it is in, based on, for example, a prepopulated/cached map data or a map data downloaded to the user's communication device from the service management server. The communication device of the user acquires 108 the location based services based on the identified location, the transmitted area information, and the contextual information. In an embodiment, the communication device of the user acquires the location based services from the beacons and/or the service management server.

In an embodiment, the beacons periodically transmit beacon frames to delineate multiple zones within the predetermined locations in the environment. As used herein, the term "zones" refers to areas of a predetermined range in the immediate vicinity of the beacons. The beacon frames transmitted by each of the beacons carry beacon related information that specify, for example, location identification information of the beacons, beacon identifiers, positional coordinates of the beacons within the predetermined locations, signal characteristics of the beacons, antenna type of the beacons, shape of radiated beam, aperture, transmit power of the beacons, and angular orientation of the antenna of each of the beacons with respect to geographic north and ground plane, etc. The beacon related information is encoded in the beacon frames. The beacon frames transmitted by each of the beacons carry beacon related information that specifies and translates to local coordinates or global coordinates. In an embodiment, the client application detects one or more of the beacons in the proximity of the communication device when the communication device enters one or more of the zones delineated by the detected beacons. The client application captures the beacon related information from the detected beacons. In another embodiment, one or more of the beacons detect the presence of the communication device when the communication device enters one or more zones delineated by the beacons. On detection, the beacons transmit the beacon frames to the detected communication device. The client application captures and extracts the beacon related information encoded in the beacon frames when the communication device enters one or more of the zones. The client application deduces the ground position of the communication device based on the beacon related information, the characteristics of the communication device, and the assembled and transmitted area information and contextual information for acquiring the location based services on the communication device. The location based services are rendered to the communication device by the client application and/or the service management server. In an embodiment, the client application renders the assembled and transmitted area information and contextual information on, for example, the display unit of the communication device. In another embodiment, the client application processes the assembled and transmitted area information and contextual information and displays the processed area information and the contextual information on the communication device.

The client application on the communication device and the beacons collect usage statistics and periodically transmit the usage statistics to the service management server. The usage statistics comprise, for example, information about the usage of the client application, online time, location versus time, location versus time versus communication device identity, etc. When the communication device is disconnected from the communication network, the client application temporarily stores the usage statistics on the communication device. When the communication device regains access to the communication network, the client application transmits the usage statistics to the service management server. The client application and the service management server share and exchange the area information and contextual information for providing location based services to the user. The service management server and the communication device operate in a mutually agreed upon format for exchanging the area information and the contextual information. The service management server assembles, processes, and transmits the area information and the contextual information to the communication device. The client application performs one or more of rendering, processing, and displaying the assembled area information and the contextual information on the communication device.

In an embodiment, the beacons transmit the beacon related information via, for example, a radio frequency component, a sonic or ultrasonic transducer, or one or more infrared components. In another embodiment, the communication device captures a graphical representation of the beacon related information projected by the beacons using, for example, an in-built image capture device on the communication device. The client application extracts the beacon related information from the captured graphical representation by optically scanning the graphical representation as disclosed in the detailed description of FIG. 4D.

Figure 6A:
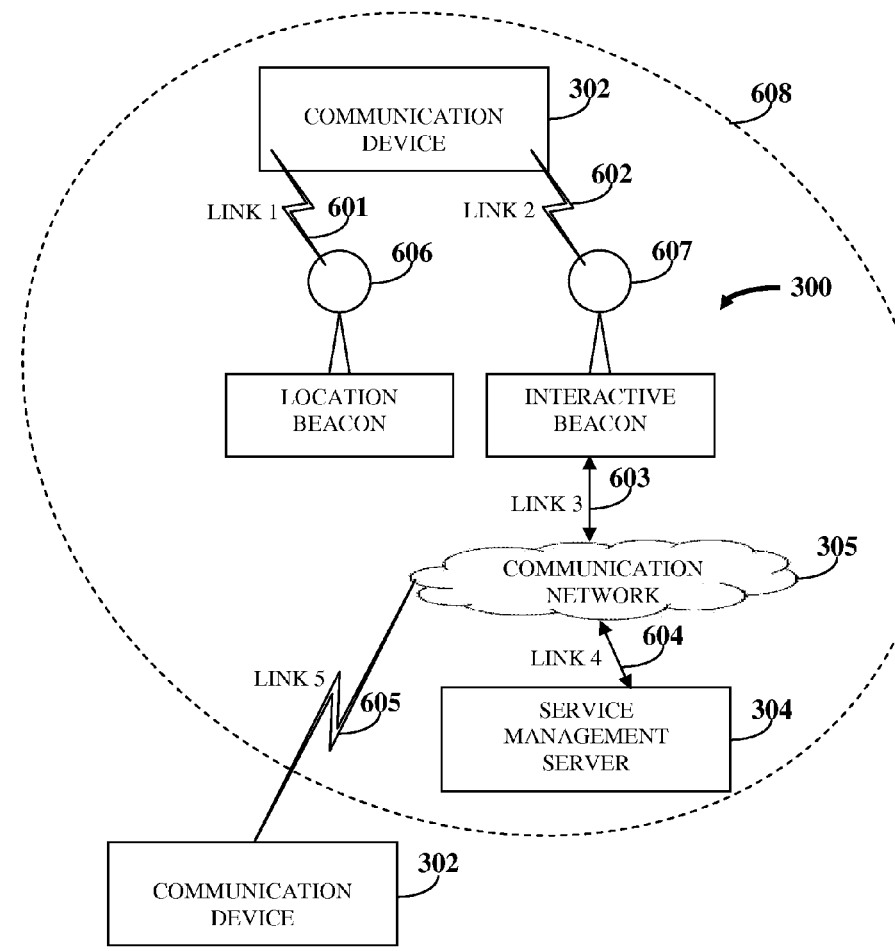
FIGS. 6A-6B exemplarily illustrate embodiments of a system for providing location based services to a user.
Figure 6B:
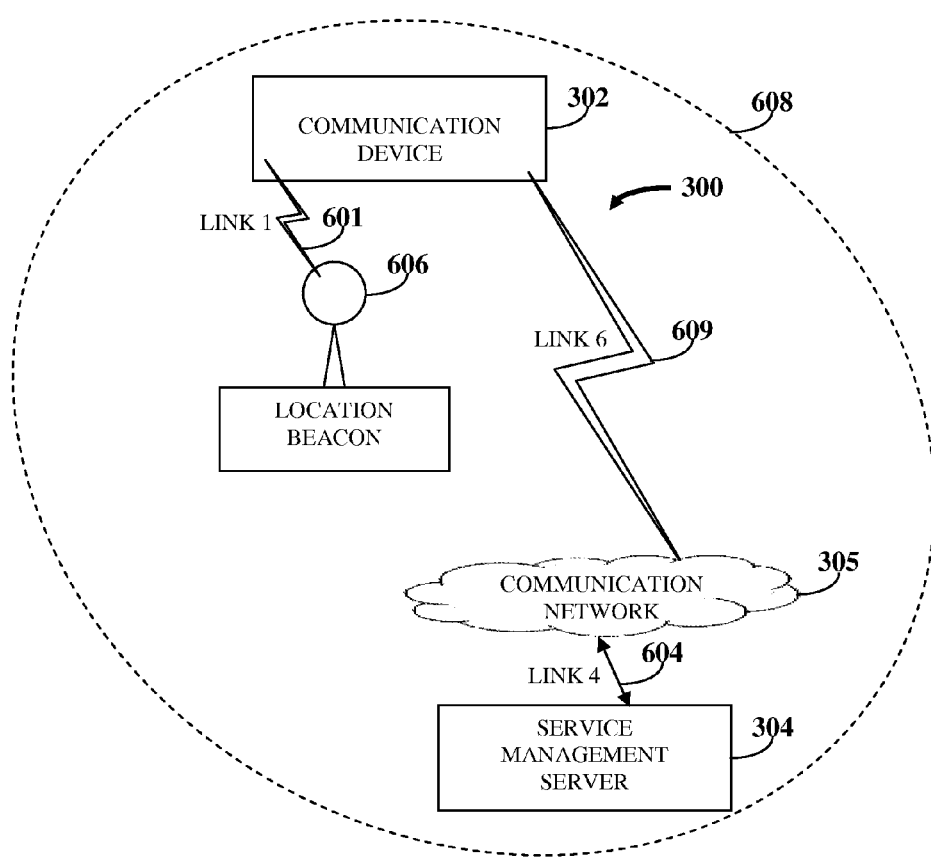

In another embodiment as exemplarily illustrated in FIGS. 6A-6B, the beacons are standalone beacons, for example, location beacons that transmit a predefined set of location identification information, area information, and contextual information to the communication device via a first communication link. The first communication link is, for example, a wireless communication link. The location identification information identifies location of the communication device. The communication device communicates with the service management server via second communication links for accessing detailed area information and contextual information. The second communication links are, for example, a combination of wired and wireless communication links, etc. In another embodiment, the beacons are interactive beacons that link the communication device to the service management server for transmitting the area information and the contextual information to the communication device. In another embodiment, the communication device remotely accesses the service management server for acquiring the area information, the contextual information, and the location based services.

Figures 7A, 7B:
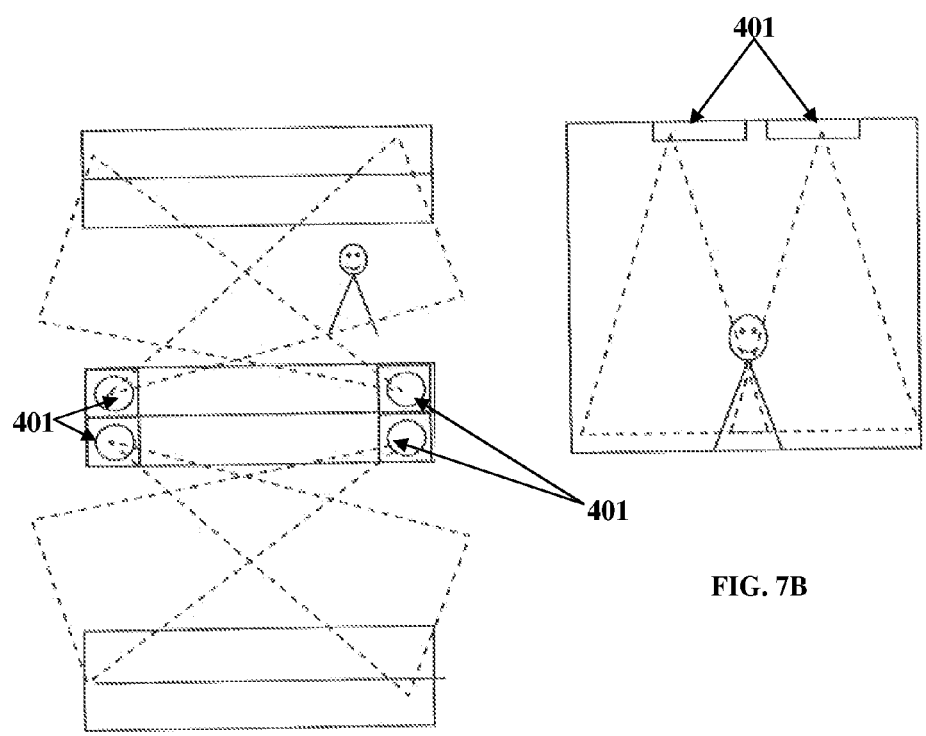
FIGS. 7A-7B exemplarily illustrate the placement of directional antennas for determining location of a user.

In an embodiment, the beacons comprise directional antennas as disclosed in the detailed description of FIGS. 7A-7B. The directional antennas are configured to generate direct line of sight paths that produce confined volumes of space for transmitting the beacon frames within the zones delineated or covered by the beacons. Based on the type of directional antenna, the beacons transmit the beacon frames in a communication mode, for example, a radio frequency mode, an infrared signaling mode, a sonic frequency mode, or an ultrasonic frequency mode receivable by the communication device.

Each of the beacons employs minimal receiving functionality required for conformance to collision avoidance. For example, the beacons transmit beacon frames to the communication device only on determining that the communication medium is idle. In an area densely populated with beacons, the beacons can incorporate algorithms to select a frequency to transmit that is least interfering to other nearby beacons. In addition, the beacons may use receivers to sense the medium and randomly back off transmission, once the beacons notice the medium is being used by another beacon. In an area sparsely populated with beacons, the receive side may be eliminated altogether.

Figure 2:
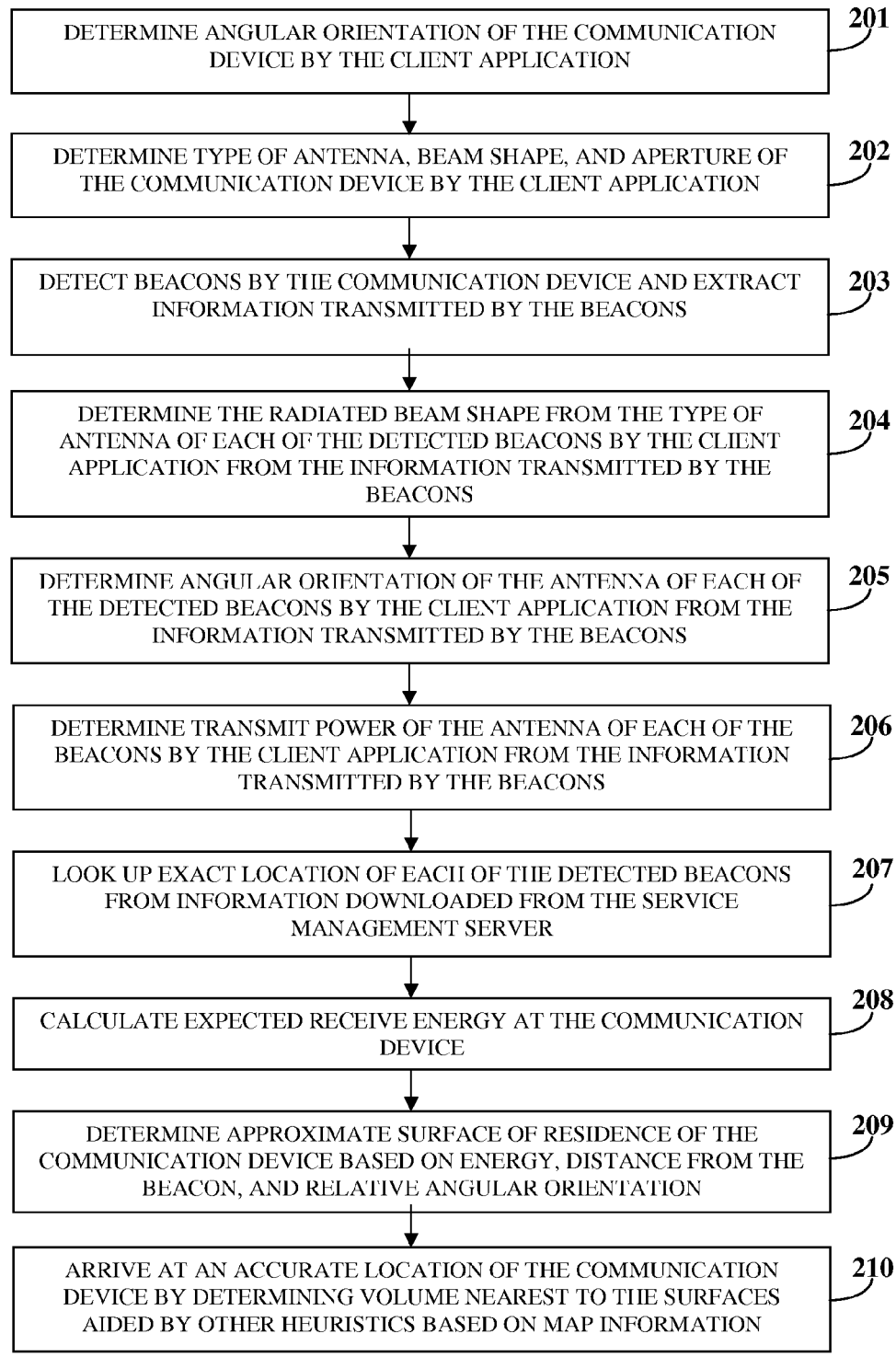
FIG. 2 exemplarily illustrates a method for identifying location of a communication device in an environment by a client application residing on the communication device.

FIG. 2 exemplarily illustrates a method for identifying location of a communication device in an environment by a client application residing on the communication device. Beacons are strategically positioned in predetermined locations across the environment. A client application is provided on the communication device. The client application determines 201 the angular orientation of the communication device with respect to the geographical north, for example, azimuth, etc. and the ground plane, for example, elevation, etc. when the information is available to the client application from the communication device. In absence of availability of this information from the communication device, the client application assumes, for example, the inclination from the ground plane to be about 60 degrees and the uniformity of the antenna over azimuth, etc. The client application determines 202 the type of antenna and hence determines the beam shape of the communication device. In an embodiment, the antenna type, beam shape and aperture are predetermined for the communication device, for example, a smart phone.

In an embodiment, the communication device detects 203 the beacons and extracts information transmitted by the beacons. The client application utilizes, for example, an algorithm based on the beacon information and the beacon location information to arrive at the location of the communication device. The client application determines 204 the radiated beam shape from the type of antenna of each of the detected beacons acquired from the information transmitted by the beacons. The client application determines 205 the angular orientation of the antenna of each of the detected beacons with respect to the geographic north and the ground plane from the information transmitted by the beacons. The client application determines 206 the transmit power of the antenna of each of the detected beacons from the information transmitted by the beacons. The information is available in the beacon packet transmitted by each of the detected beacons. The client application looks up 207 the exact location of each detected beacon from prior downloaded information from the service management server. The client application calculates 208 the expected received energy at the communication device. The client application determines 209 the approximate surface of residence of the communication device based on, for example, energy, distance from the beacon, relative angular orientation, etc., from either a table or a formula that expresses the expected received energy as function of distance and direction of the beacon antenna downloaded from the service management server. The client application arrives 210 at an accurate location of the communication device by determining the volume nearest to the surfaces aided by other heuristics based on map information.

Figure 3:
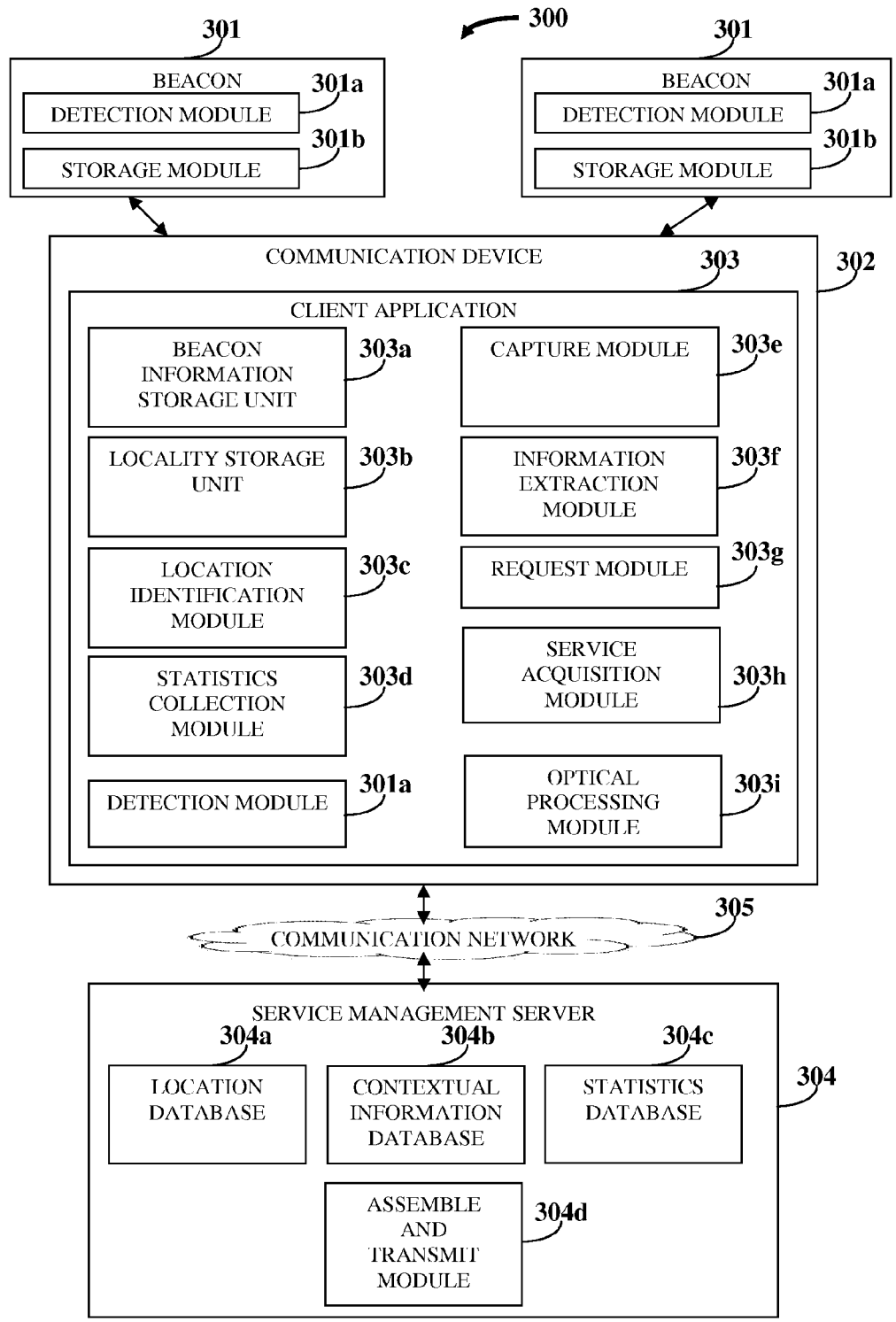
FIG. 3 illustrates a system for providing location based services to a user.

FIG. 3 illustrates a system 300 for providing location based services to a user. The system 300 disclosed herein comprises multiple beacons 301, a service management server 304, and a communication device 302. The beacons 301 are strategically positioned to delineate multiple zones within predetermined locations in an environment. The beacons 301 encode and project beacon related information. Each of the beacons 301 comprises a detection module 301a and a storage module 301b. The detection module 301a of each of the beacons 301 detects presence of the communication device 302 when the communication device 302 enters one or more of the zones delineated or covered by the beacons 301. In another embodiment, a client application 303 on the communication device 302 comprises a detection module 301a for detecting one or more of the beacons 301 in proximity of the communication device 302 when the communication device 302 enters one or more of the zones delineated or covered by the beacons 301. The storage module 301b of each of the beacons 301 stores a predefined set of location identification information, area information, and contextual information. In an embodiment, each of the standalone beacons 301, for example, location beacons, retrieves a predefined set of location identification information, area information, and contextual information stored in the storage module 301b and transmits the retrieved information to the communication device 302. The storage module 301b also collects and stores usage statistics. The beacons 301 periodically transmit the usage statistics to the service management server 304. The service management server 304 comprises an assemble and transmit module 304d for assembling and transmitting area information and contextual information to the communication device 302 based on a request sent by the client application 303 to the service management server 304 via a communication network 305.

The communication device 302 comprises the client application 303 with a user interface. The communication device 302 is capable of receiving the beacon related information from the beacons 301 in one or more communication modes, for example, one or more of a radio frequency mode, a sonic frequency mode, an ultrasonic frequency mode, an infrared signaling mode, an optical signaling mode, etc. The client application 303 comprises a capture module 303e, an information extraction module 303f, a request module 303g, a location identification module 303c, and a service acquisition module 303h. The capture module 303e captures the beacon related information from the beacons 301 in one or more of the communication modes. The information extraction module 303f extracts the captured beacon related information. The information extraction module 303f extracts relevant encoded information from the beacon frames and contacts the service management server 304 based on the extracted information. The request module 303g sends a request for area information and contextual information based on the extracted beacon related information to the service management server 304 via the communication network 305.

The location identification module 303c identifies location of the communication device 302 in the environment, based on one or more of the extracted beacon related information, characteristics of the communication device 302, and the assembled and transmitted area information. The location identification module 303c determines the characteristics of the communication device 302 and utilizes at least the extracted beacon related information and the determined characteristics of the communication device 302 to identify the location of the communication device 302. The location identification module 303c identifies the location of the communication device 302 using, for example, an algorithm as disclosed in the detailed description of FIG. 2. The location identification module 303c uses a beacon information storage unit 303a and a locality storage unit 303b to arrive at the location of the communication device 302 and hence the pertinent contextual information. As the communication device 302 moves to a new location, for example, one building to another building within a campus or one floor to another floor within a building, area information related to the new location is downloaded from the service management server 304. It is also possible to download the entire information simultaneously, such that the communication device 302 can move around the building without requiring any more downloads from the service management server 304.

The location identification module 303c deduces ground position of the communication device 302 based on the captured beacon related information, for example, positional coordinates of the beacons 301 within the predetermined locations, signal characteristics of each of the beacons 301, antenna type of each of the beacons 301, transmit power of each of the beacons 301, orientation of each of the beacons 301, etc. The location identification module 303c also deduces the ground position of the communication device 302 based on the characteristics of the communication device 302, for example, the angular orientation of the communication device 302, type of antenna of the communication device 302, shape of a radiated beam, aperture, etc. The location identification module 303c may also deduce the ground position of the communication device 302 based on the area information and the contextual information acquired from the service management server 304 for acquiring the location based services on the communication device 302. The service acquisition module 303h acquires the location based services on the communication device 302 of the user from the service management server 304 based on the identified location, the transmitted area information, and the contextual information.

The client application 303 on the communication device 302 further comprises the beacon information storage unit 303a, the locality storage unit 303b, a statistics collection module 303d, and an optical processing module 303i. The beacon information storage unit 303a maintains a table of the detected beacons 301 and stores identification information, for example, the service set identifier (SSID), basic service set identifier (BSSID) of the beacons 301, positional coordinates of the beacons 301 within the predetermined locations, signal characteristics of the beacons 301, antenna types of the beacons 301, orientation of the beacons 301, frequency, receive power, beacon detection time stamps, type of antenna, transmit power of the beacons 301, type and angular directions of beacon antennas, etc. The locality storage unit 303b stores area information and contextual information that is downloaded from the service management server 304. For example, the locality storage unit 303b stores an indoor map, location of beacons 301 in the map, contextual information about interesting locations of the map, etc. The contextual information is, for example, information on the conference room, office number, cafeteria, etc. The locality storage unit 303b also stores area information and contextual information transmitted to the communication device 302 from the service management server 304 for each of the zones delineated by the beacons 301 and entered by the communication device 302. The statistics collection module 303d collects usage statistics, for example, information about the usage of the client application 303, and transmits the collected usage statistics to the service management server 304 periodically and when the communication device 302 regains access to the service management server 304.

The communication device 302 contains a repertoire of locating algorithms. One of the locating algorithms uses, for example, the location of the beacon 301 emitting the strongest signal as the location of the communication device 302. Other algorithms use, for example, the information encoded in the SSID of the beacon frame to arrive at a more accurate location. The optical processing module 303i interfaces with an in-built image capture device of the communication device 302 and analyzes images to extract the beacon related information. The client application 303 triggers the in-built image capture device to capture images and then analyzes the captured images for any beacon related information. Any permutation and combination of different modes of beacon related information transmission, for example, a radio frequency mode, an infrared signaling mode, sonic or ultrasonic frequency modes, optical modes, etc. are available to the communication device 302 simultaneously.

The service management server 304 communicates with the communication device 302 via the communication network 305. The service management server 304 runs on standard server hardware. The service management server 304 resides in a data center that houses computer systems and associated components, such as telecommunications and storage systems. The service management server 304 further comprises a location database 304a, a contextual information database 304b, and a statistics database 304c. The location database 304a stores information, for example, the location of the beacons 301 on floor maps, floor plans of the interior of buildings, etc. The contextual information database 304b stores information on points of interest in the map, for example, information on the occupant of a room, meetings in progress in a conference room, advertisements appropriate for the location, goods and services available in the location, etc. In an embodiment, the communication device 302 and the service management server 304 follow the same format to store information. The statistics database 304c stores information provided by the communication device 302. In an embodiment, the service management server 304 comprises a hierarchy of servers. The hierarchy of servers is, for example, a group of service management servers 304 in the environment or a group of servers stacked together to constitute a single service management server 304. A first one of the hierarchy of servers refers at least a second one of the hierarchy of servers. The communication device 302 contacts and accesses one or more of the hierarchy of servers in a hierarchical order for acquiring the area information, the contextual information, and the location based services.

In an embodiment, the beacons 301 periodically transmit beacon related information as one or more beacon frames to delineate multiple zones in predetermined locations. In another embodiment, the communication device 302 captures a graphical representation of the beacon related information projected by the beacons 301. The client application 303 extracts the beacon related information from the captured graphical representation by optically scanning the graphical representation using the optical processing module 303i.

Figure 4A:
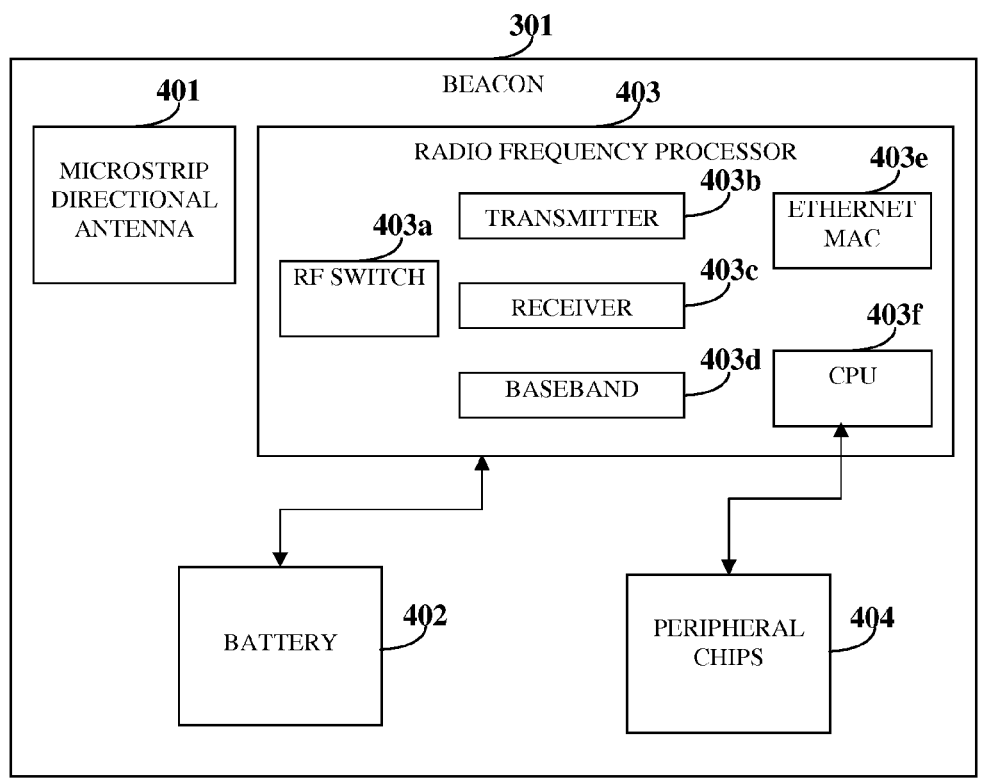
FIG. 4A exemplarily illustrates an architectural block diagram of a beacon that transmits beacon related information in a radio frequency mode receivable by the communication device.
Figure 4B:
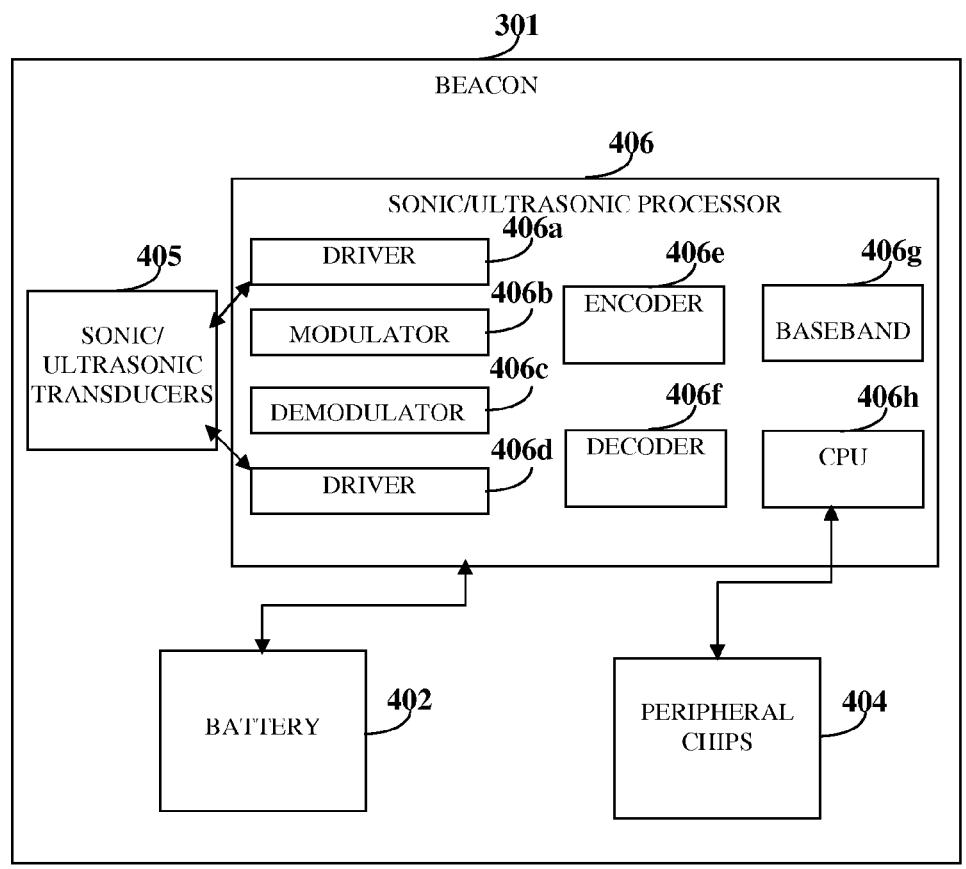
FIG. 4B exemplarily illustrates an architectural block diagram of a beacon that transmits beacon related information in a sonic frequency mode or an ultrasonic frequency mode receivable by the communication device.
Figure 4C:
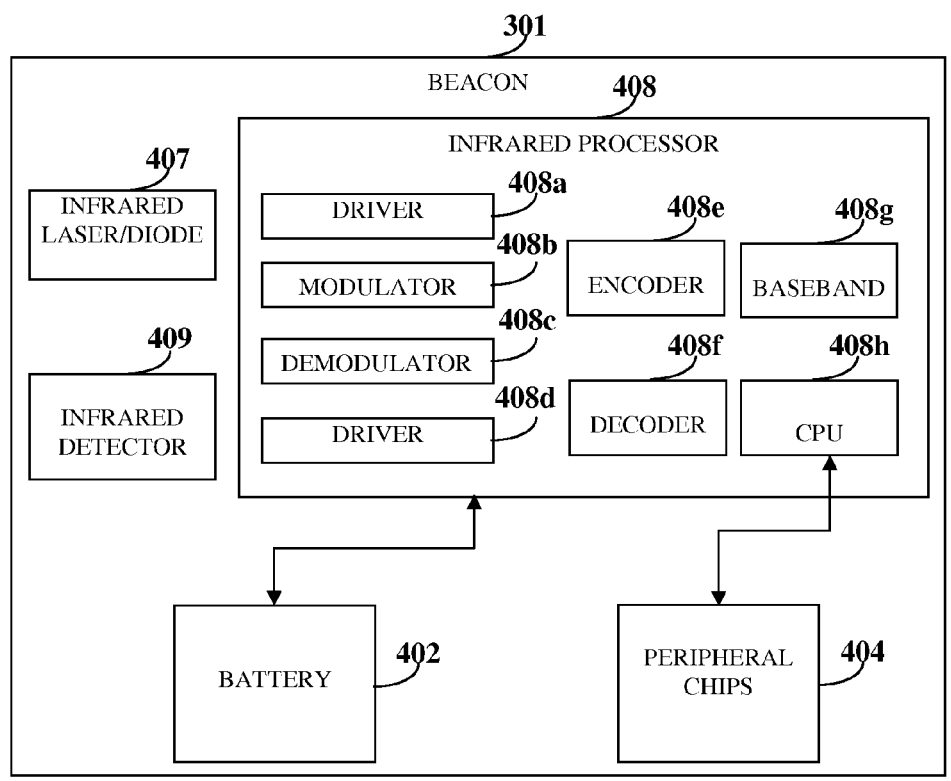
FIG. 4C exemplarily illustrates an architectural block diagram of a beacon that transmits beacon related information in an infrared signaling mode receivable by the communication device.

In an embodiment, each of the beacons 301 comprises one of a radio frequency component, a sonic transducer, an ultrasonic transducer, and one or more infrared components for transmitting the beacon related information as one or more beacon frames in one of the communication modes receivable by the communication device 302 as disclosed in the detailed description of FIGS. 4A-4C.

In another embodiment, the beacons 301 comprise directional antennas. The directional antennas are compact and are configured to generate direct line of sight paths that produce confined volumes of space for transmitting the beacon frames within the zones delineated by the beacons 301. The beacon frames transmitted by the beacons 301 carry one or more beacon signal packets that specify the beacon related information as disclosed in the detailed description of FIG. 1. Each of the beacons 301 employs minimal receiving functionality required for conformance to collision avoidance for optimal utilization of energy. In an embodiment, the beacons 301 eliminate the receiver functionality entirely for optimal utilization of energy.

The beacons 301 use, for example, a service set identifier (SSID) to encode information, for example, as follows: HHH-HHNNNNNTTPPDDDEEE, where "HHHHH" is the prefix to identify that the packet is from a beacon 301, "NNNNN" is the beacon identifier (ID), "TT" is the type of the beacon 301, "PP" is the transmit power of the beacon 301, "DDD" is the angular distance from the geographical north and "EEE" is the angular distance from the vertical direction. As used herein "service set" refers to devices associated with, for example, a specific local or enterprise 802.11 wireless local area network (LAN). As used herein, "802.11" refers to an 802.11 wireless communication standard.

In another embodiment, the beacons 301 use, for example, a format with fields, for example, as follows: sync, header, payload, and trailer, where the "sync" field is a pattern of alternating 0s and 1s of fixed length, for synchronizing a transmitter 403b and a receiver 403c exemplarily illustrated in FIG. 4A, the "header" field contains information about the payload, the "payload" field contains, for example, the beacon related information transmitted from the transmitter 403b to the receiver 403c, and the "trailer" contains error correction and detection bits, for example, cyclic redundancy check (CRC).

In addition, the beacons 301 encode additional area information, for example, illumination, temperature, radiation level, etc. that is used by the communication device 302. However, the additional area information may not be essential to determine the location of the communication device 302. Additionally, the area information may also be encoded in a vendor specific information element (IE). The area information provided in this case can be more extensive, for example, address of the service management server 304, etc.

For purposes of illustration, the detailed description refers to implementation using the 802.11 wireless communication standard; however the scope of the method and system 300 disclosed herein is not limited to the 802.11 communication standard but may be extended to include other wireless technologies, for example, a sonic/ultrasonic transducer, infrared components, 802.15.4, WiGig, etc.

The communication device 302 is, for example, a mobile phone, a personal digital assistant (PDA), a laptop, or any other computing device. The communication device 302 may be replaced by any device with a central processing unit (CPU), operating system (OS), and an 802.11 wireless network interface. The communication device 302 may also be a tag without any user interface. The method and system 300 disclosed herein may also be adapted to outdoor or wider areas, employing the encoding of latitude and longitude in the SSID of the beacon signal. One foot accuracy requires 8 digits for both longitude and latitude, for example, 2.78e-6 degree for 1 foot. In this scenario, a geotagged material may be used instead of the service management server 304. As used herein, the term "geotagged material" refers to digital content that has been tagged with local and global coordinates, for example, longitudinal and latitudinal coordinates.

FIG. 4A exemplarily illustrates an architectural block diagram of a beacon 301 that transmits beacon related information in a radio frequency mode receivable by the communication device 302. The radio frequency mode is implemented using, for example, an 802.11 wireless communication standard. The beacon 301 comprises radio frequency component, for example, a radio frequency processor 403. The beacon 301 further comprises a microstrip directional antenna 401, a battery 402, and one or more peripheral chips 404, for example, inclination, compass, memory, flash, etc. The microstrip directional antenna 401, for example, a circular patch antenna, provides a focused beam that confines the beacon frame energy to a narrow volume. The battery 402 provides the power required to run the beacon 301. The beacon 301 contains additional power supply arrangements using, for example, photovoltaic panels, connection to an electrical grid, etc. The inclination and compass peripheral chips 404 provide the angular orientations of the micro strip directional antenna 401.

The radio frequency processor 403 comprises a radio frequency (RF) switch 403a, a transmitter 403b, a receiver 403c, a baseband 403d processor, an Ethernet media access control (MAC) 403e, and a central processing unit (CPU) 403f. The RF switch 403a enables switching between a transmission signal and a received signal. The transmitter 403b transmits beacon frames with encoded area information in the SSID and/or the vendor specific information element. The receiver 403c implements the collision avoidance mechanism. The collision avoidance mechanism is employed for the receiver 403c to sense the communication medium for activity before transmitting a beacon frame. The receiver 403c only transmits if the communication medium is idle. In an embodiment, the receiver functionality is entirely eliminated. The baseband 403d processor describes signals and systems with frequency ranging from zero to the highest signal frequency. To help in synchronization between the transmitter 403b and the receiver 403c, a fixed number of frequencies can be specified and hence known to both the transmitter 403b and the receiver 403c. The Ethernet MAC 403e is, for example, an 802.11 wireless communication standard, etc. and stores unique identifiers assigned to the beacon 301. The CPU 403*f* provides the operating system and other software for the beacon 301.

FIG. 4B exemplarily illustrates an architectural block diagram of a beacon 301 that transmits beacon related information in a sonic frequency mode or an ultrasonic frequency mode receivable by the communication device 302. The beacon 301 comprises one or more sonic/ultrasonic transducers 405, a sonic/ultrasonic processor 406, a battery 402, and one or more peripheral chips 404, for example, inclination, compass, memory, flash, etc. The sonic/ultrasonic frequency transducers 405 provide a focused beam to confine the beacon frame energy to a narrow volume. The battery 402 provides the power required to run the beacon 301. The beacon 301 may contain additional power supply arrangements using, for example, photovoltaic panels, connection to an electrical grid, etc. The inclination and compass peripheral chips 404 provide the angular orientations of the sonic/ultrasonic frequency transducers 405.

The sonic/ultrasonic processor 406 comprises a set of drivers 406*a* and 406*d*, a modulator 406*b*, a demodulator 406*c*, an encoder 406*e*, a decoder 406*f*, a baseband 406*g* processor, and a central processing unit (CPU) 406*h*. The sonic/ultrasonic transducer 405 enables switching between a transmitted signal and a received signal and is connected to the set of drivers 406*a* and 406*d*. In an embodiment, a single transducer 405 can be used for both transmitting and receiving signals with an appropriate switch. The driver 406*a* is fed by the modulator 406*b* to transmit. The driver 406*d* feeds into a demodulator 406*c* for receive. The modulation of the sonic waveform can be, for example, an amplitude modulation (AM), a frequency modulation (FM), a phase modulation (PM), their combination, or orthogonal frequency division multiplexing (OFDM). The encoder 406*e* and decoder 406*f* add, for example, error correction, randomization, etc. for the transmitting and receiving side respectively. The baseband 406*g* processor describes signals and systems with frequency ranging from zero to the highest signal frequency. The CPU 406*h* provides the operating system and other software for the beacon 301. The communication device 302 captures the raw sonic waveform and passes the waveform through, for example, a fast fourier transform (FFT) software implemented on the communication device 302 to transform the time domain to the frequency domain. After transformation, the FFT software demodulates and decodes the waveform. The beacon 301 transmitting beacon related information via a sonic or ultrasonic frequency transducer 405 is, for example, a television (TV), a radio, etc.

FIG. 4C exemplarily illustrates an architectural block diagram of a beacon 301 that transmits beacon related information in an infrared signaling mode receivable by the communication device 302. The beacon 301 comprises infrared components, for example, an infrared laser or diode 407, an infrared detector 409, and an infrared processor 408. The beacon 301 further comprises a battery 402 and one or more peripheral chips 404, for example, inclination, compass, memory, flash, etc. The infrared laser or diode 407 provides a focused beam to confine the beacon frame energy to a narrow volume. The infrared detector 409 detects the communication device 302 enabled with infrared connectivity. The battery 402 provides the power required to run the beacon 301. The beacon 301 contains additional power supply arrangements using, for example, photovoltaic panels, a connection to an electrical grid, etc. The inclination and compass peripheral chips 404 provide the angular orientations of the infrared laser or diode 407.

The infrared processor 408 comprises a set of drivers 408*a* and 408*d*, a modulator 408*b*, a demodulator 408*c*, an encoder 408*e*, a decoder 408*f*, a baseband 408*g* processor, and a central processing unit (CPU) 408*h*. The infrared laser or diode 407 enables switching between a transmitted signal and a received signal and is connected to the set of drivers 408*a* and 408*d*. In an embodiment, a single infrared laser or diode 407 can be used for both transmitting and receiving signals with an appropriate switch. The driver 408*a* is fed by the modulator 408*b* to transmit the signal. The driver 408*d* feeds into a demodulator 408*c* to receive the signal. The modulation of the infrared waveform can be, for example, intensity modulation with direct detection (IM/DD). The encoder 408*e* and decoder 408*f* add, for example, error correction, randomization, etc. for the transmitting and receiving side respectively. The baseband 408*g* processor describes signals and systems with frequency ranging from zero to the highest signal frequency. The CPU 408*h* provides the operating system and other software for the beacon 301. The communication device 302 captures the infrared waveform, demodulates, and decodes the waveform.

Figure 4D:
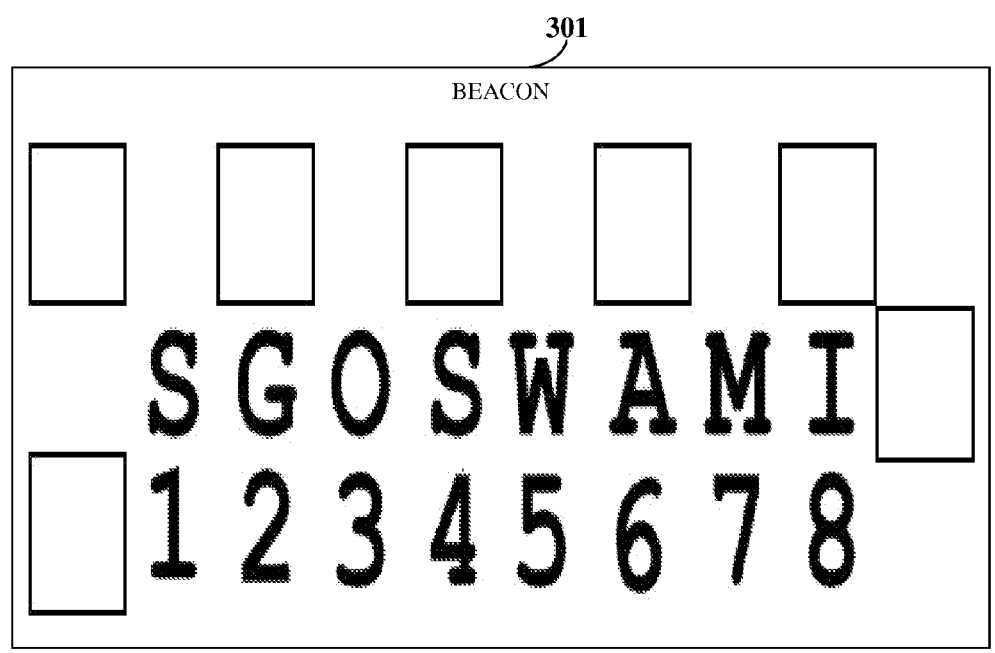
FIG. 4D exemplarily illustrates a beacon projecting beacon related information.

FIG. 4D exemplarily illustrates a beacon 301 projecting beacon related information. In this embodiment, the beacon 301 is, for example, a printed piece of paper, a light-emitting diode (LED) display, a liquid crystal display (LCD) screen, a cathode ray tube (CRT) screen, or a combination thereof. The beacon 301 comprises, for example, an outer section and an inner section. The outer section comprises a pattern of elementary shapes, for example, squares, rectangles, circles, etc. In FIG. 4D, the outer section comprises, for example, an alternating pattern of squares. The inner section comprises beacon related information as one or more lines of characters, for example, alphanumeric characters. Each character is contained in a square. The size of each square is determined by the minimum number of pixels covered by an in-built camera of the communication device 302 from a certain distance. The pixels are, for example, 100 pixels when viewed with a 2.0 mega pixel image capture device at a distance of 24 ft from the beacons 301 without slanting the image capture device. The communication device 302 captures a graphical representation of the beacon related information projected by the beacon 301 using, for example, an in-built image capture device on the communication device 302. The graphical representation comprises the outer section comprising a pattern of elementary shapes and the inner section comprising one or more lines of characters. The client application 303 extracts the beacon related information from the captured graphical representation by optically scanning the graphical representation using the optical processing module 303*i*.

Figure 5A:
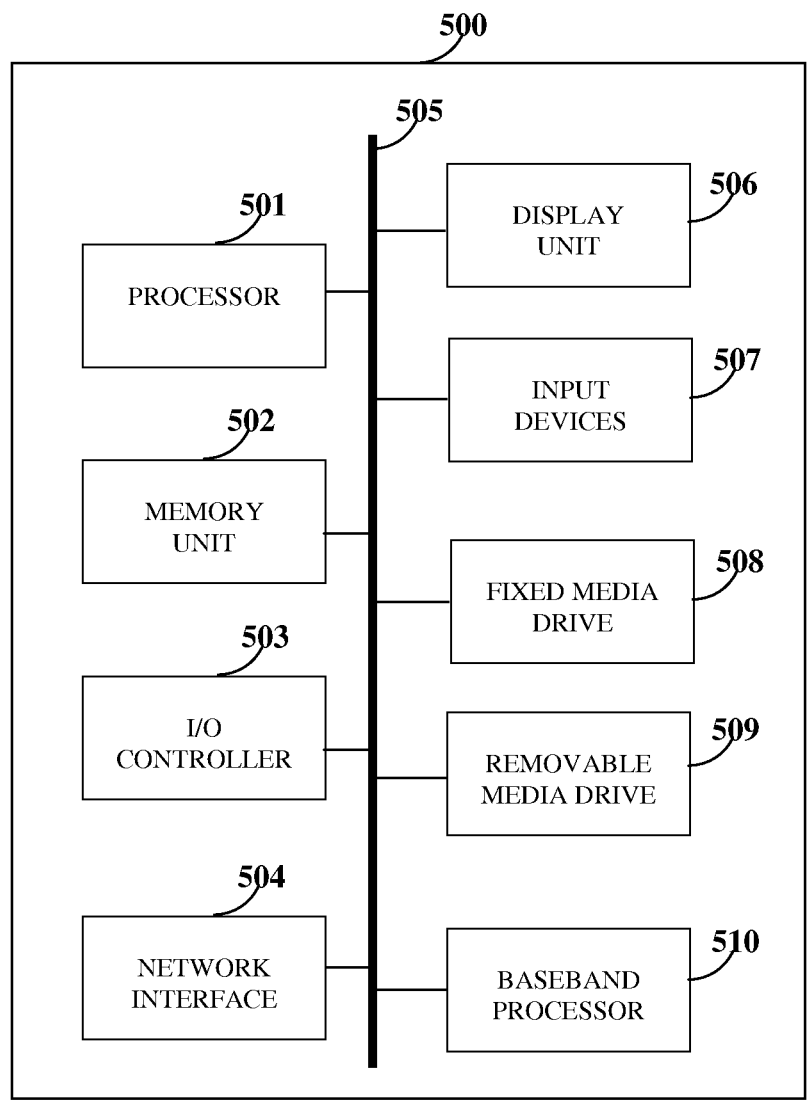
FIG. 5A exemplarily illustrates a computer system employed for providing location based services to a user.

FIG. 5A exemplarily illustrates a computer system 500 employed in, for example, the communication device 302 and the service management server 304 for providing location based services to a user. The client application 303 is deployed on, for example, the computer system 500 of the communication device 302. The communication device 302 comprises an operating system, an operating system application programmable interface (API), and a network interface 504.

The communication device 302 and the service management server 304 communicate with each other via the communication network 305. The communication network 305 is, for example, a local area network (LAN), a wide area network (WAN), a cellular network, a satellite network, a wireless communication network, etc. The computer system 500 comprises, for example, a processor 501, a memory unit 502 for storing programs and data, an input/output (I/O) controller 503, a network interface 504, a network bus 505, a display unit 506, input devices 507, a fixed media drive 508, a removable media drive 509, a baseband processor 510, etc.

The processor 501 is an electronic circuit that executes computer programs. The memory unit 502 is used for storing programs and applications. The client application 303 is, for example, stored on the memory unit 502 of the computer system 500. The memory unit 502 is, for example, a random access memory (RAM) or another type of dynamic storage device that stores information and instructions for execution by the processor 501. The memory unit 502 also stores temporary variables and other intermediate information used during execution of the instructions by the processor 501. The computer system 500 further comprises a read only memory (ROM) or another type of static storage device that stores static information and instructions for the processor 501. The network interface 504 enables connection of the computer system 500 to the communication network 305. For example, the network interface 504 of the communication device 302 connects the communication device 302 wirelessly to the communication network 305. The network interface 504 of the service management server 304 connects the service management server 304 wirelessly to the communication network 305. The communication device 302 further comprises a baseband processor 510 for processing communication functions and managing communication transactions with the communication network 305. The I/O controller 503 controls the input and output actions performed by the user. The network bus 505 of the communication device 302 permits communication between the modules, for example, 303a, 303b, 303c, 303d, 303e, 303f, 303g, 303h, and 303i of the client application 303. The network bus 505 of the service management server 304 permits communication between the modules, for example, 304a, 304b, 304c, and 304d of the service management server 304.

The display unit 506 displays computed results on the user interface of the communication device 302. The input devices 507 are used for inputting data into the computer system 500. The input devices 507 are, for example, a keyboard such as an alphanumeric keyboard, a joystick, a mouse, a touch pad, a light pen, etc. The computer system 500 further comprises a fixed media drive 508 and a removable media drive 509 for receiving removable media.

Computer applications and programs are used for operating the computer system 500. The programs are loaded onto the fixed media drive 508 and into the memory unit 502 of the computer system 500 via the removable media drive 509. In an embodiment, the computer applications and programs may be loaded directly through the communication network 305. Computer applications and programs are executed by double clicking a related icon displayed on the display unit 506 using one of the input devices 507. The user interacts with the computer system 500 using, for example, a graphical user interface (GUI) of the display unit 506.

The computer system 500 employs operating systems for performing multiple tasks. An operating system is responsible for the management and coordination of activities and the sharing of the resources of the computer system 500. The operating system further manages security of the computer system 500, peripheral devices connected to the computer system 500, and network connections. The operating system employed on the computer system 500 recognizes, for example, inputs provided by the user using one of the input devices 507, the output display, files and directories stored locally on the fixed media drive 508, etc. The operating system on the computer system 500 of the communication device 302 executes different programs initiated by the user using the processor 501. Instructions for executing the client application 303 are retrieved by the processor 501 from the program memory in the form of signals. The location of the instructions in the program memory is determined by a program counter (PC). The program counter stores a number that identifies the current position in the program of the client application 303.

The instructions fetched by the processor 501 from the program memory after being processed are decoded. After processing and decoding, the processor 501 executes the instructions. For example, the assemble and transmit module 304d defines instructions for assembling and transmitting area information and contextual information to the communication device 302 based on a request sent by the client application 303 via the communication network 305. The detection module 301a defines instructions for detecting one or more beacons 301 in the proximity of the communication device 302, when the communication device 302 enters one or more of the zones delineated or covered by the detected beacons 301. The capture module 303e defines instructions for capturing the beacon related information transmitted by the beacons 301 in one or more of the communication modes. The information extraction module 303f defines instructions for extracting the captured beacon related information. The information extraction module 303f defines instructions for extracting relevant encoded information from the beacon frames and contacting the service management server 304 with the extracted information. The optical processing module 303i defines instructions for optically scanning a graphical representation of the beacon related information captured by the communication device 302 to extract the beacon related information. The request module 303g defines instructions for sending a request for area information and contextual information based on the extracted beacon related information to the service management server 304 via the communication network 305. The location identification module 303c defines instructions for identifying location of the communication device 302 in the environment. The location identification module 303c defines instructions for deducing ground position of the communication device 302 based on the captured beacon related information, the characteristics of the communication device 302, and the area information and contextual information acquired from the service management server 304. The service acquisition module 303h defines instructions for acquiring the location based services on the communication device 302 of the user based on the identified location, the area information, and the contextual information assembled and transmitted by the service management server 304. The statistics collection module 303d defines instructions for collecting usage statistics on the communication device 302 and periodically transmitting the usage statistics to the service management server 304. The defined instructions are stored in the program memory or received from a remote server.

Furthermore, the detection module 301a on the beacons 301 defines instructions for detecting presence of the communication device 302 when the communication device 302 enters one or more zones delineated by the beacons 301. The processor 403, 406, or 408 of the beacon 301 retrieves the instructions defined by the detection module 301a and executes the instructions.

The processor 501 of the communication device 302 retrieves the instructions defined by the detection module 301a, the capture module 303e, the information extraction module 303f, the request module 303g, the location identification module 303c, the service acquisition module 303h, the statistics collection module 303d, and the optical processing module 303i of the client application 303 and executes the instructions. Furthermore, the processor 501 of the service management server 304 retrieves the instructions defined by the assemble and transmit module 304*d* and executes them.

Figure 5B:
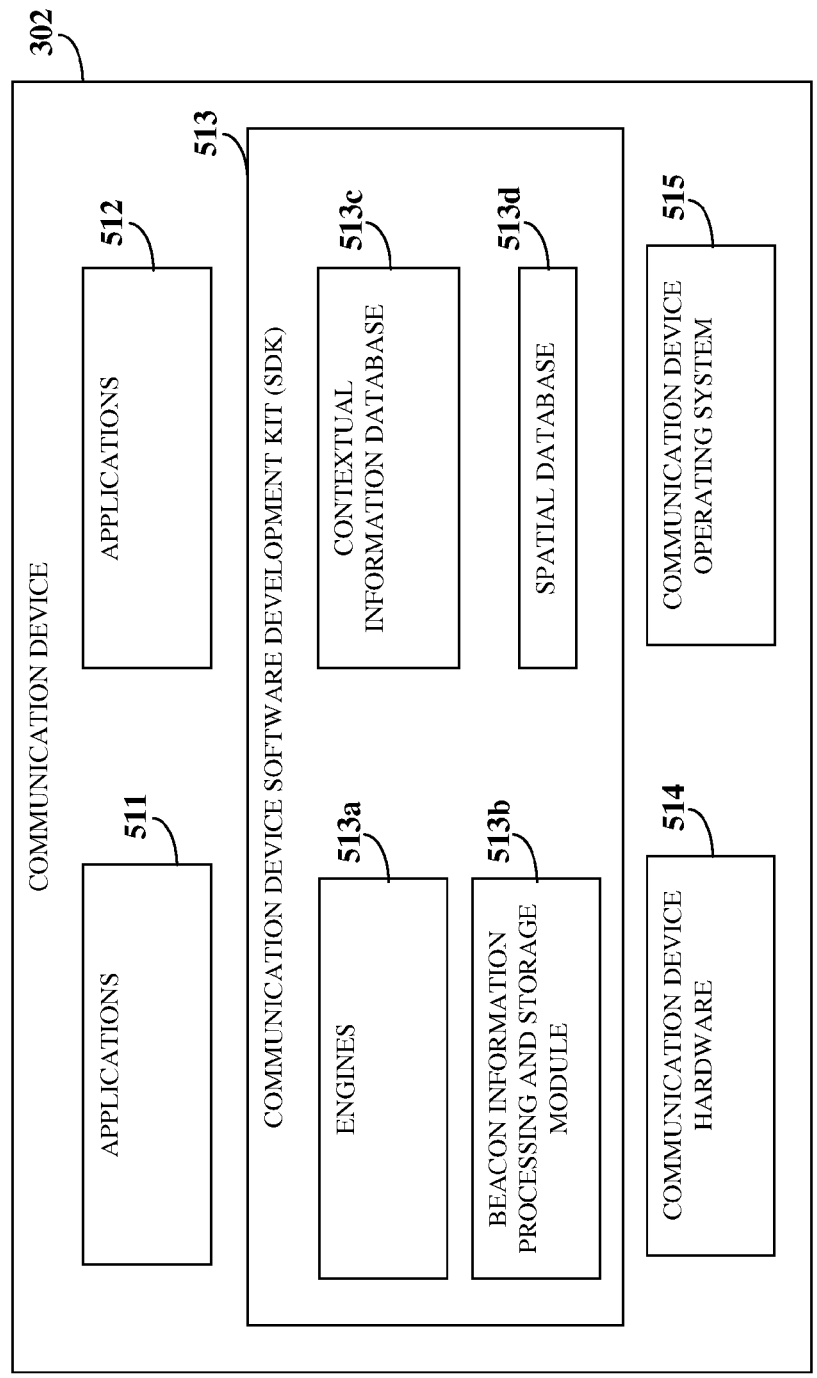
FIG. 5B exemplarily illustrates an architecture of a communication device employed for acquiring location based services from a service management server.

FIG. 5B exemplarily illustrates an architecture of a communication device 302 employed for acquiring location based services from a service management server 304. The communication device 302 comprises multiple applications 511 and 512, a communication device software development kit (SDK) 513, communication device hardware (HW) 514, and a communication device operating system (OS) 515. The applications 511 and 512 are, for example, map display 511, advertisement display 512, etc. to display the location based services acquired at the communication device 302. The communication device software development kit (SDK) 513 comprises a spatial database 513*d*, a contextual information database 513*c*, a beacon information processing and storage module 513*b*. The communication device SDK 513 further comprises engines 513*a*, for example, a routing engine, an advertisement engine, a statistics engine, etc. to perform corresponding routing, advertisement, and statistics based functions. The beacon information processing and storage module 513*b* stores beacon related information and processes the information required for use by the communication device 302, for example, at a later time. The contextual information database 513*c* stores contextual information, for example, advertisements, room information, etc. The spatial database 513*d* provides location based services to a user. The communication device hardware (HW) 514 provides the communication device 302 with the hardware required for, for example, detecting beacons 301, installing the operating system (OS) 515, installing the client application 303, related software, etc. The communication device operating system (OS) 515 manages and coordinates activities and sharing of the resources by the modules, for example, 303*a*, 303*b*, 303*c*, 303*d*, 303*e*, 303*f*, 303*g*, 303*h*, etc. of the communication device 302.

Figure 5C:
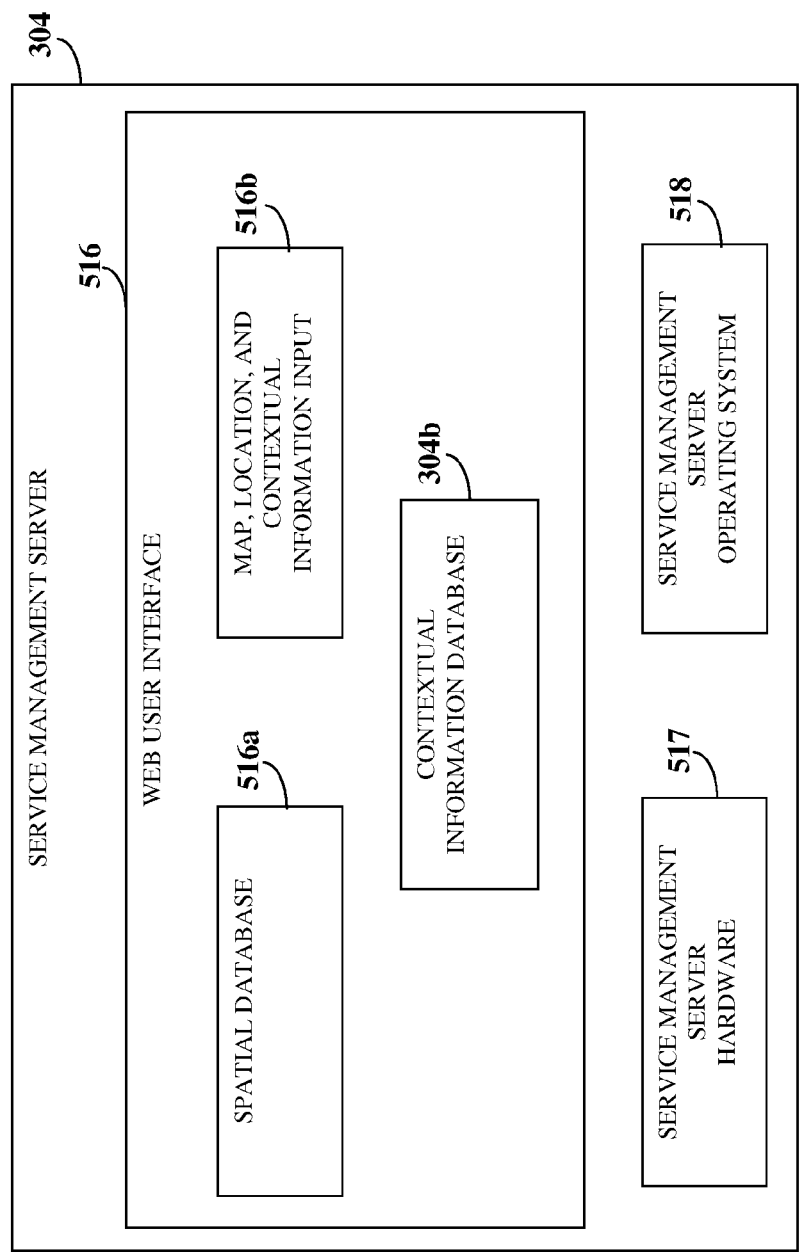
FIG. 5C exemplarily illustrates an architecture of a service management server employed for providing location based services to a user.

FIG. 5C exemplarily illustrates an architecture of a service management server 304 employed for providing location based services to a user. The service management server 304 comprises a web user interface 516, service management server hardware (HW) 517, and a service management server operating system (OS) 518. The web user interface 516 is the interface of the service management server 304 through which the communication device 302 interacts with the service management server 304. The web user interface 516 interfaces with a spatial database 516*a*, a contextual information database 304*b* that stores, for example, advertisement, room information, etc. and input 516*b*, for example, map, location, contextual information, etc. The contextual information database 304*b* stores data relating to contextual information that the communication device 302 requires at any given point of time. The input 516*b* provides, for example, a map, location, contextual information, etc. The spatial database 516*a* provides location based services to the user of the communication device 302. The service management server hardware 517 provides the communication device 302 with the hardware required for, for example, installing the operating system (OS) 518, related software, etc. The service management server operating system (OS) 518 manages and coordinates activities and sharing of the resources by the modules, for example, 304*a*, 304*b*, 304*c*, 304*d*, etc. of the service management server 304.

FIG. 6A exemplarily illustrates embodiments of a system 300 for providing location based services to a user. The system 300 disclosed herein comprises the communication device 302, multiple beacons 606 and 607, and the service management server 304 interacting via the communication network 305. The communication network 305 is, for example, a network with switches, routers, access points, etc. and provides an interface between the beacons 607 and the service management server 304. The service management server 304 facilitates the management of the beacons 607. In an embodiment, multiple beacons 301 are deployed in predetermined locations to provide area information and contextual information. The beacons 301 comprise, for example, location beacons 606 and interactive beacons 607.

In an embodiment, the communication device 302, on entering the zones delineated by the beacons 301 in the environment 608, communicates with one of the interactive beacons 607 via the link 2 602. The interactive beacons 607 link the communication device 302 to the service management server 304 for providing the area information and contextual information to the communication device 302. The link 2 602 is a wireless link, for example, WiFi, Bluetooth™, Zigbee®, Infrared, etc. that links the communication device 302 and the interactive beacon 607. The interactive beacon 607 and the communication network 305 are connected via link 3 603. The link 3 603, for example WiFi, worldwide interoperability for microwave access (WiMAX), Ethernet, Powerline, etc. is a network connection between the interactive beacon 607 and the communication network 305. The communication network 305 and the service management server 304 are connected via link 4 604. The link 4 604, for example, Ethernet, etc. is a high speed wired connection between the communication network 305 and the service management server 304.

In another embodiment, the communication device 302 on entering the zones delineated by the beacons 301 in the environment 608 communicates with one of the location beacons 606 via the link 1 601. The location beacons 606 are, for example, standalone beacons that provide a predefined set of location identification information, area information, and contextual information directly to the communication device 302. Each of the location beacons 606 comprises a storage module 301*b* that stores the predefined set of location identification information, area information, and contextual information for providing area information and contextual information to the communication device 302. Link 1 601, for example WiFi, Bluetooth™, Zigbee®, Infrared, etc. is a wireless link between the communication device 302 and the location beacons 606.

In another embodiment, the communication device 302 remotely accesses the service management server 304 via the communication network 305 to acquire area information and contextual information, when the communication device 302 is outside the zones delineated by the beacons 301 in the environment 608. The communication device 302 and the communication network 305 communicate via link 5 605. Link 5 605, for example WiFi access point, 3G, long term evolution (LTE), WiMAX base transceiver station (BTS), etc. is a wireless link between the communication device 302 and the communication network 305. The communication device 302 provides the user interface to the user. The communication network 305 is, for example, a network with switches, routers, access points, base terminal stations, cellular networks, etc. and provides an interface between the communication device 302 and the service management server 304. Link 4 604, for example, Ethernet, etc. is a high speed wired connection between the communication network 305 and the service management server 304. Link 4 604 connects the communication network 305 to the service management server 304.

FIG. 6B exemplarily illustrates another embodiment of a system 300 for providing location based services to a user. The communication device 302 on entering the zones delineated by the beacons 301 in the environment 608 senses one or more of the location beacons 606 via the link 1 601. The location beacons 606 are, for example, standalone beacons that store a predefined set of location identification information, area information, and contextual information as disclosed in the detailed description of FIG. 6A. The location beacons 606 provide the predefined set of location identification information, area information, and contextual information stored in the storage module 301b to the communication device 302 via a first communication link, for example, Link 1 601. Link 1 601, for example, WiFi, Bluetooth™, Zigbee®, Infrared, etc. is a wireless link between the communication device 302 and the location beacons 606. The communication device 302 accesses detailed location identification information, and area information and contextual information, for example, additional area information and contextual information, etc. by contacting the service management server 304 via second communication links, for example, a combination of a Link 6 609, a communication network 305, and a Link 4 604. The Link 6 609, for example, WiFi access point, 3G, long term evolution (LTE), WiMAX base transceiver station (BTS), etc. is a wireless link between the communication device 302 and the communication network 305. The communication network 305 is, for example, a network with switches, routers, access points, base terminal stations, cellular networks, etc. and provides an interface between the communication device 302 and the service management server 304. Link 4 604, for example, Ethernet, etc. is a high speed wired connection between the communication network 305 and the service management server 304. Link 4 604 connects the communication network 305 to the service management server 304.

FIGS. 7A-7B exemplarily illustrate the placement of directional antennas 401 for determining location of a user. The directional antennas 401 in the system 300 disclosed herein are configured to generate direct line of sight paths that produce confined volumes of space for transmitting the beacon frames within the zones delineated or covered by the beacons 301. Multiple microstrip directional antennas 401 are appropriately positioned, for example, in an aisle of a supermarket, as exemplarily illustrated in FIG. 7A, to accomplish maximum radiation flow. The microstrip directional antennas 401 may be positioned such that their radiating patterns intersect. The microstrip directional antennas 401 may be mounted on top of the aisle, in the middle, or below the aisle to avoid obstruction of the radiation. The microstrip directional antennas 401 are mounted at the bottom of the aisle for operation in a high-ceiling environment, where the radiations need to travel a large distance before being reflected back. The microstrip directional antenna 401 is, for example, a circular patch antenna. The path generated by the microstrip directional antenna 401 is, for example, a cone of a certain angle that depends on the size of the microstrip directional antenna 401. In another example, multiple microstrip directional antennas 401 are mounted on the ceiling of a room, as exemplarily illustrated in FIG. 7B, for operation in a low-ceiling type of environment or a room environment.

The beacons 301 perform signal manipulation for accurate estimation of the signal strength. The method and system 300 disclosed herein mitigates multipath fading on the beacon signal received at the communication device 302 through manipulation of the transmitted signal at each of the beacons 301 and calculation thereafter at the communication device 302. The beacons 301 comprise patch array antennas 401 and regular access point circuitry. The beacon electronic circuitry continually varies the parameters, for example, transmitted energy, frequency, etc. of the beacon signals within the range of the beacon signals. The beacon signals comprise multiple classes of information, for example, energy and frequency used instantaneously, type, shape, orientation of the antenna 401, the above stated parameters from other beacons 301 and the communication device 302. The client application 303 on the communication device 302 captures the beacon signals to arrive at an accurate signal strength and estimates the location of the communication device 302. The communication device 302 in the line of sight of the radiating path of the microstrip directional antennas 401 has a greater receive power than the communication device 302 receiving solely non-line of sight radiation.

Figure 8:
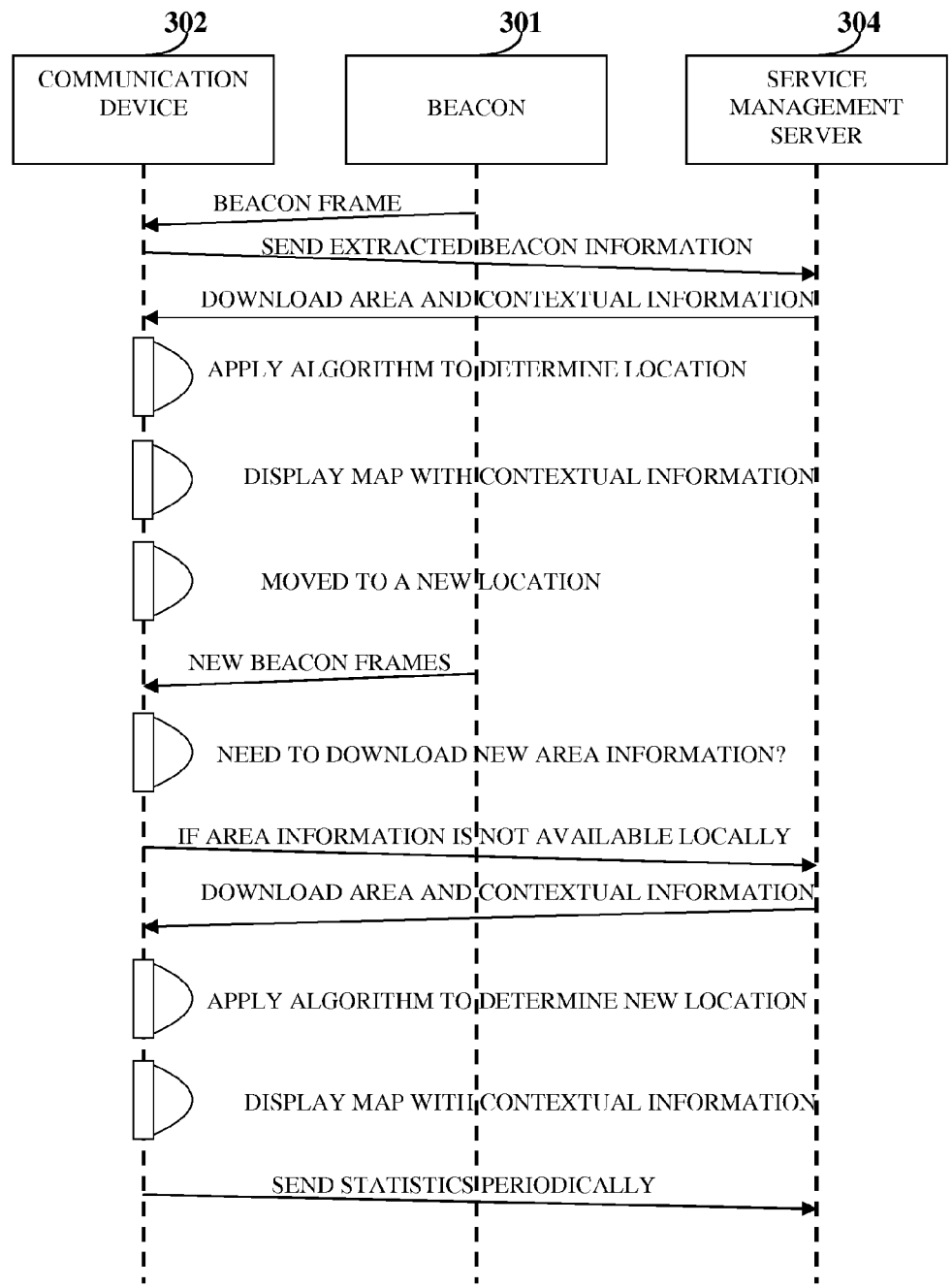
FIG. 8 exemplarily illustrates a flow diagram of the steps involved in providing location based services to a user.

FIG. 8 exemplarily illustrates a flow diagram of the steps involved in providing location based services to a user. The communication device 302 is preloaded with the client application 303. The client application 303 on the communication device 302 detects the beacons 301 on entering a zone that is previously deployed with the beacons 301. The beacons 301 transmit beacon frames to the communication device 302. The client application 303 on the communication device 302 extracts the encoded information contained in the beacon frames and transmits the extracted information to the service management server 304. The communication device 302 then accesses the service management server 304. The address of the service management server 304 is, for example, hard coded, embedded in the payload, or maintained in a directory that is known to the client application 303. The client application 303 then downloads the area information and contextual information from the location database 304a and the contextual information database 304b of the service management server 304 and determines its location using a location identification algorithm as disclosed in the detailed description of FIG. 2. After determining its location, the client application 303 displays a map or other indoor location based contextual information. When the communication device 302 moves to a new location, the client application 303 captures the new beacon frames and extracts the encoded information contained in the new beacon frames to determine its new location. If the area information is not available locally, the client application 303 accesses the service management server 304 and downloads area information and contextual information. The client application 303 may then apply the algorithm to determine its new location. After determining its location, the client application 303 displays a map or other indoor location based contextual information. The client application 303 also uploads usage statistics to the service management server 304 periodically.

Consider an example, where the client application 303 detects the presence of the beacons 301 in proximity to the communication device 302. Service offerings information of vendors is transmitted to the detected communication device 302. The client application 303 categorizes the service offerings information into multiple categories. The client application 303 communicates with the service management server 304 to receive location based services and advertisements of the vendors based on the categories selected by the user. Environmental sensors on the beacons 301 capture environmental data of a region surrounding the beacons 301. The location based services and advertisements are correlated with the environmental data and local time data. The correlated information and the advertisements are then transmitted to the client application 303 for rendering area information and contextual information to the user.

Consider another example, where a user carrying a communication device 302 enabled with the client application 303 is moving around a facility, for example, an office building, in an environment. When the user enters the beacon coverage zone, the user is provided with the user's current location on a map of the interior of the office building, based on pre-populated/cached map data or map data downloaded from the service management server 304. The user can then query point of interests, for example, conference rooms, restrooms, cafeteria, hallway, laboratory, stairs, elevators, clinics, waiting area, etc. using the system 300 disclosed herein. Subsequently, the user is provided with the route to the point of interest. The user is also provided with the events happening in the user's vicinity or at the point of interest. In another example, consider a store, where a user carrying a communication device 302 enabled with the client application 303 is moving in a beacon coverage zone. The client application 303 on the user's communication device 302 provides the user with merchandise information, along with advertisements and promotions on nearby merchandise. The user can query about a particular merchandise, and is provided the route to obtain the queried merchandise.

It will be readily apparent that the various methods and algorithms described herein may be implemented in a computer readable medium appropriately programmed for general purpose computers and computing devices. Typically a processor, for example, one or more microprocessors will receive instructions from a memory or like devices, and execute those instructions, thereby performing one or more processes defined by those instructions. Further, programs that implement such methods and algorithms may be stored and transmitted using a variety of media, for example, computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Perl, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described such as the location database 304a, the contextual information databases 304b and 513c, the statistics database 304c, and the spatial databases 513d and 516a, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of providing location based services and advertisements to a user, comprising:
encoding and projecting beacon related information from a plurality of beacons strategically positioned in predetermined locations in an environment, wherein said beacon related information comprises one or more of location identification information of said beacons, positional coordinates of said beacons within said predetermined locations, signal characteristics of said beacons, antenna type of said beacons, shape of a radiated beam, aperture, transmit power of said beacons, and angular orientation of an antenna of each of said beacons with respect to a geographic north and a ground plane, and wherein said plurality of beacons are configured to communicate with one or more communication devices using a combination of communication modes comprising a radio frequency mode, a sonic frequency mode, an ultrasonic frequency mode, an infrared signaling mode, and an optical signaling mode;

placing one or more environmental sensors on said beacons, wherein said environmental sensors are configured for capturing environmental data of a region surrounding said beacons;

capturing said environmental data of said region surrounding said beacons, by said environmental sensors;

configuring said beacons for periodically transmitting said beacon related information, said captured environmental data and a local time data as one or more beacon frames to delineate a plurality of zones in said environment;

configuring said plurality of beacons for detecting presence of said communication devices when said communication devices enter one or more zones delineated by said beacons, wherein said beacons transmit said beacon related information to said detected communication device;

said communication device being associated with said user, wherein said communication device comprises a client application, wherein said communication device is configured for receiving said beacon related information, said captured environmental data, and said local time data from said beacons in one or more of said communication modes;

said client application configured for detecting one or more of said beacons in proximity of said communication device when said communication device enters one or more zones delineated by said detected one or more beacons, wherein said client application is configured to receive said beacon related information, said captured environmental data, and said local time data from said detected one or more beacons;

said client application configured for extracting said beacon related information, said captured environmental data, and said local time data encoded in said beacon frames, wherein said beacon frames carry said beacon related information that specify and translate to one of local coordinates and global coordinates;

said client application configured for determining characteristics of said communication device, wherein said characteristics comprise one or more of angular orientation of said communication device, type of antenna of said communication device, shape of a radiated beam, and aperture;

said client application configured for sending a request to a service management server for area information and contextual information based on said extracted beacon related information, via a communication network;

said communication device configured for receiving said area information and said contextual information from said service management server, via said communication network;

said client application configured for locating said communication device in said environment based on one or more of said extracted beacon related information, said determined characteristics of said communication device, said received area information and said received contextual information;

said communication device configured for acquiring said location based services and said advertisements based on said identified location, said received area information and said received contextual information; and said client application correlating said location based services and said advertisements acquired from said service management server with said environmental data received from environmental sensors placed on said beacons and said local time data received from said beacons; and said client application rendering said correlated data on a display screen of said communication device of said user.

2. The method of claim 1, wherein said beacons, said service management server and said communication device operate in a mutually agreed upon format for exchanging said area information and said contextual information, wherein said area information and said contextual information are assembled in said service management server, and wherein said client application performs one of rendering, processing, and displaying said assembled area information and said contextual information on said communication device.

3. The method of claim 1, further comprising deducing ground position of said communication device by said client application based on said captured beacon related information and said characteristics of said communication device, and said area information and said contextual information acquired from said service management server, wherein said ground position is utilized for acquiring said location based services and said advertisements on said communication device.

4. The method of claim 1, further comprising capturing by said communication device a graphical representation of said beacon related information projected by said beacons, wherein said graphical representation comprises an outer section comprising a pattern of elementary shapes and an inner section comprising one or more lines of characters, wherein said client application extracts said beacon related information from said captured graphical representation by optically scanning said graphical representation.

5. The method of claim 1, wherein said beacons comprise directional antennas configured to generate direct line of sight paths that produce confined volumes of space for transmitting said beacon related information as one or more beacon frames within zones delineated by said beacons.

6. The method of claim 1, wherein said beacons are location beacons, wherein said location beacons transmit a predefined set of location identification information, area information, and contextual information to said communication device via a first communication link, wherein said location identification information identifies location of said communication device, and wherein said communication device communicates with said service management server via second communication links for accessing detailed area information and contextual information.

7. The method of claim 1, wherein said beacons are interactive beacons that link said communication device to said service management server for transmitting said area information and said contextual information to said communication device.

8. The method of claim 1, wherein each of said beacons employs minimal receiving functionality required for conformance to collision avoidance.

9. The method of claim 1, wherein said location based services and said advertisements are rendered by one or more of said client application and said service management server.

10. The method of claim 1, further comprising collecting usage statistics on said communication device by said client application and said beacons and periodically transmitting said usage statistics to said service management server.

11. The method of claim 1, wherein said communication device remotely accesses said service management server for acquiring said area information, said contextual information, said location based services, and said advertisements.

12. A system for providing location based services and advertisements to a user, comprising:
- a plurality of beacons strategically positioned in predetermined locations in an environment, wherein said beacons encode and project beacon related information comprising one or more of location identification information of said beacons, positional coordinates of said beacons within said predetermined locations, signal characteristics of said beacons, antenna type of said beacons, shape of a radiated beam, aperture, transmit power of said beacons, and angular orientation of an antenna of each of said beacons with respect to a geographic north and a ground plane, and wherein said plurality of beacons are configured to communicate with one or more communication devices using a combination of communication modes comprising a radio frequency mode, a sonic frequency mode, an ultrasonic frequency mode, an infrared signaling mode, and an optical signaling mode;
- one or more environmental sensors placed on said beacons, wherein said environmental sensors are configured for capturing environmental data of a region surrounding said beacons;
- said beacons configured for periodically transmitting said beacon related information, said captured environmental data and a local time data as one or more beacon frames to delineate a plurality of zones in said environment;
- said beacons comprising a detection module configured for detecting presence of said communication device when said communication device enters one or more zones delineated by said beacons, wherein said beacons transmit said beacon related information, said captured environmental data and said local time data to said detected communication device;
- a service management server comprising an assemble and transmit module for assembling and transmitting area information and contextual information to said communication device based on a request sent to said service management server by a client application on said communication device via a communication network;
- said client application on said communication device, wherein said communication device is capable of receiving said beacon related information, said captured environmental data and said local time data from said beacons in one or more communication modes, and wherein said client application comprises:
  - a capture module for receiving said beacon related information, said captured environmental data and said local time data in said one or more communication modes;
  - an information extraction module for extracting said captured beacon related information, said captured environmental data and said local time data;
  - a request module for sending a request for said area information and said contextual information based on said extracted beacon related information to said service management server via said communication network;
  - a location identification module for locating said communication device in said environment based on one or more of said extracted beacon related information, characteristics of said communication device, and said assembled and transmitted area information;
  - a service acquisition module for acquiring said location based services and said advertisements on said communication device of said user based on said identified location, said area information and said contextual information transmitted by said service management server; and
  - a detection module for detecting one or more of said beacons in proximity of said communication device when said communication device enters one or more zones delineated by said detected one or more beacons, wherein said client application captures said beacon related information, said captured environmental data, and said local time data from said detected one or more beacons;
- said client application configured for extracting said beacon related information, said captured environmental data and said local time data encoded in said beacon frames, wherein said beacon frames carry said beacon related information that specify and translate to one of local coordinates and global coordinates;
- said client application configured for determining characteristics of said communication device, wherein said characteristics comprise one or more of angular orientation of said communication device, type of antenna of said communication device, shape of a radiated beam, and aperture;
- said client application configured for locating said communication device in said environment based on one or more of said extracted beacon related information, said determined characteristics of said communication device, and said assembled and transmitted area information;
- said communication device configured for acquiring said location based services and said advertisements based on said identified location, said transmitted area information, and said contextual information;
- said client application configured for correlating said location based services and said advertisements acquired from said service management server with said environmental data received from environmental sensors placed on said beacons and said local time data received from said beacons; and
- said client application rendering said correlated data on a display screen of said communication device of said user.

13. The system of claim 12, wherein said communication device captures a graphical representation of said beacon related information projected by said beacons, wherein said client application extracts said beacon related information from said captured graphical representation by optically scanning said graphical representation using an optical processing module.

14. The system of claim 12, wherein said beacons comprise directional antennas configured to generate direct line of sight paths that produce confined volumes of space for transmitting said beacon related information as one or more beacon frames within zones delineated by said beacons.

15. The system of claim 12, wherein each of said beacons comprises a storage module that stores said predefined set of location identification information, area information, contextual information, and usage statistics, wherein said beacons periodically transmit said usage statistics to said service management server.

16. The system of claim 12, wherein said location identification module deduces ground position of said communication device based on said captured beacon related information and said characteristics of said communication device, and said area information and said contextual information acquired from said service management server for acquiring said location based services and said advertisements on said communication device.

17. The system of claim 12, wherein said client application further comprises:
- a beacon information storage unit that maintains a table of detected beacons and stores information for identification of said beacons, positional coordinates of said beacons within said predetermined locations, signal characteristics of said beacons, antenna types of said beacons, frequency, receiver power, transmit power of said beacons, orientation of said beacons, beacon detection time stamps, and type and angular directions of beacon antennas;
- a statistics collection module that collects usage statistics on said communication device and periodically transmits said usage statistics to said service management server; and
- a locality storage unit that stores area information and contextual information transmitted to said communication device from said service management server for each of one or more zones delineated by said beacons.

18. The system of claim 12, wherein said service management server comprises a hierarchy of servers, wherein a first one of said hierarchy of servers refers at least a second one of said hierarchy of servers, and wherein said communication device contacts and accesses one or more of said hierarchy of servers in a hierarchical order for acquiring said area information, said contextual information, said location based services, and said advertisements.

19. A computer program product comprising computer executable instructions embodied in a non-transitory computer readable storage medium, wherein said computer program product comprises:
- a first computer parsable program code for providing a client application on a communication device of a user, wherein said communication device is capable of receiving beacon related information, environmental data captured by environmental devices placed on beacons, and a local time data from a plurality of beacons, and wherein said plurality of beacons are configured to communicate with one or more communication devices using a combination of communication modes comprising a radio frequency mode, a sonic frequency mode, an ultrasonic frequency mode, an infrared signaling mode, and an optical signaling mode;
- a second computer parsable program code for capturing said environmental data of a region surrounding said beacons using environmental sensors placed on said beacons, and for capturing said local time data;
- a third computer parsable program code for capturing said beacon related information comprising one or more of location identification information of said beacons, positional coordinates of said beacons within said predetermined locations, signal characteristics of said beacons, antenna type of said beacons, shape of a radiated beam, aperture, transmit power of said beacons, and angular orientation of an antenna of each of said beacons with respect to a geographic north and a ground plane, from said plurality of beacons strategically positioned in predetermined locations in an environment;
- a fourth computer parsable program code for extracting said captured beacon related information, said captured environmental data and said local time data;
- a fifth computer parsable program code for sending a request to a service management server for area information and contextual information based on said extracted beacon related information via a communication network;
- a sixth computer parsable program code for locating said communication device in said environment based on one or more of said extracted beacon related information and characteristics of said communication device, and area information assembled and transmitted by said service management server;
- a seventh computer parsable program code for acquiring location based services and advertisements on said communication device of said user based on said identified location, said area information and said contextual information assembled and transmitted by said service management server; and
- an eighth computer parsable program code for correlating said location based services and said advertisements acquired from said service management server with said environmental data received from environmental sensors placed on said beacons and said local time data received from said beacons, and rendering said correlated data on a display screen of said communication device of said user.

* * * * *